(12) United States Patent
Karthik et al.

(10) Patent No.: US 12,738,273 B2
(45) Date of Patent: Sep. 15, 2026

(54) DEVICES, SYSTEMS, AND METHODS FOR SECURE AND TRUSTWORTHY VOICE ASSISTANCE

(71) Applicant: ARTIK LLC, Rancho Palos Verdes, CA (US)

(72) Inventors: Akshobh Karthik, Rancho Palos Verdes, CA (US); Karthik Rajamony, Rancho Palos Verdes, CA (US)

(73) Assignee: ARTIK LLC, Rancho Palos Verdes, CA (US)

( * ) Notice: Subject to any disclaimer, the term of this patent is extended or adjusted under 35 U.S.C. 154(b) by 0 days.

(21) Appl. No.: 19/536,012

(22) Filed: Feb. 10, 2026

(65) Prior Publication Data

US 2026/0253585 A1 Aug. 27, 2026

Related U.S. Application Data

(60) Provisional application No. 63/762,961, filed on Feb. 25, 2025.

(51) Int. Cl.
*G10L 15/22* (2006.01)

(52) U.S. Cl.
CPC .................................. *G10L 15/22* (2013.01)

(58) Field of Classification Search
CPC ...................................................... G10L 15/22
See application file for complete search history.

(56) References Cited

U.S. PATENT DOCUMENTS

| | | | | |
|---|---|---|---|---|
| 12,482,465 | B1 * | 11/2025 | Fidler | G10L 15/1822 |
| 12,488,796 | B1 * | 12/2025 | Copeland | G10L 15/1822 |
| 2024/0210194 | A1 * | 6/2024 | Sharifi | G10L 15/22 |
| 2025/0191493 | A1 * | 6/2025 | Morse | G09B 19/04 |
| 2025/0317518 | A1 * | 10/2025 | Koneru | G10L 15/22 |
| 2025/0321708 | A1 * | 10/2025 | Treat | G06F 3/167 |

* cited by examiner

*Primary Examiner* — Frantz B Jean
(74) *Attorney, Agent, or Firm* — Fresh IP PLC; Clifford D. Hyra; Aubrey Y. Chen

(57) ABSTRACT

Disclosed herein are novel voice assistants and voice assistant technologies for increasing user security and privacy. Specifically disclosed are voice assistants that run locally (that is, on a specific user device and without sending and/or receiving data from a remote server) to receive the user's voice commands and execute one or more tasks (e.g., operating a smart device, home appliance, and the like).

20 Claims, 23 Drawing Sheets

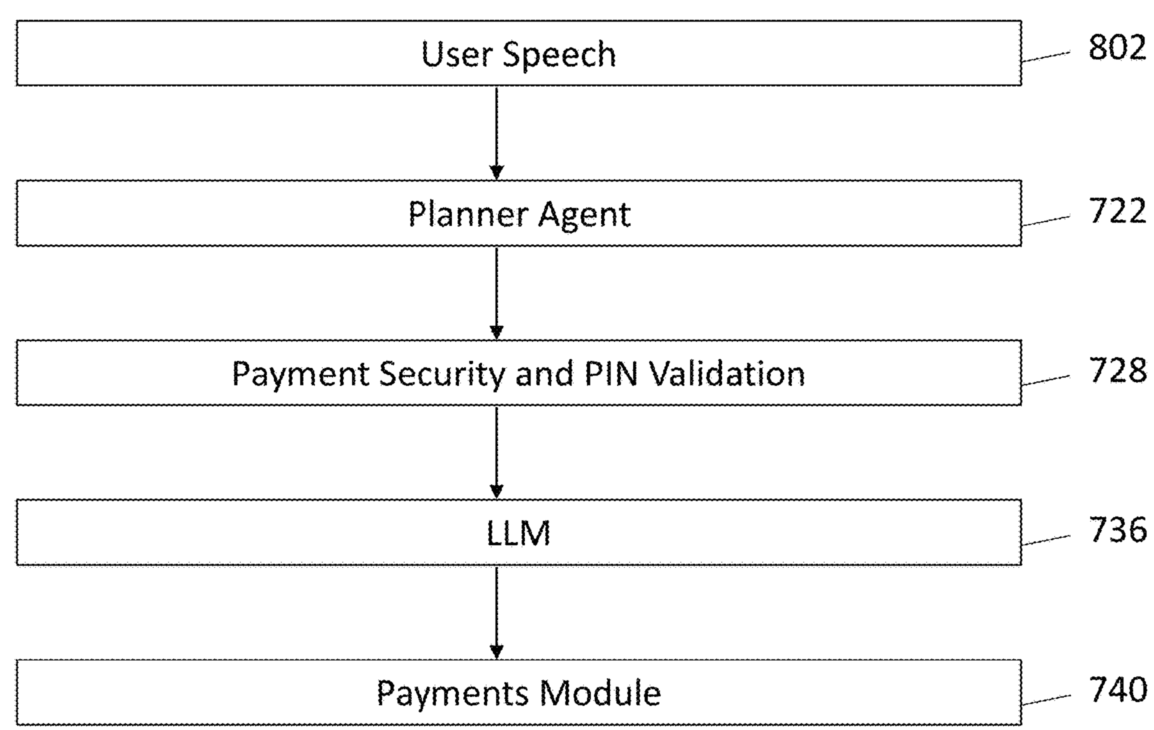
FIG. 8

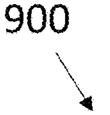
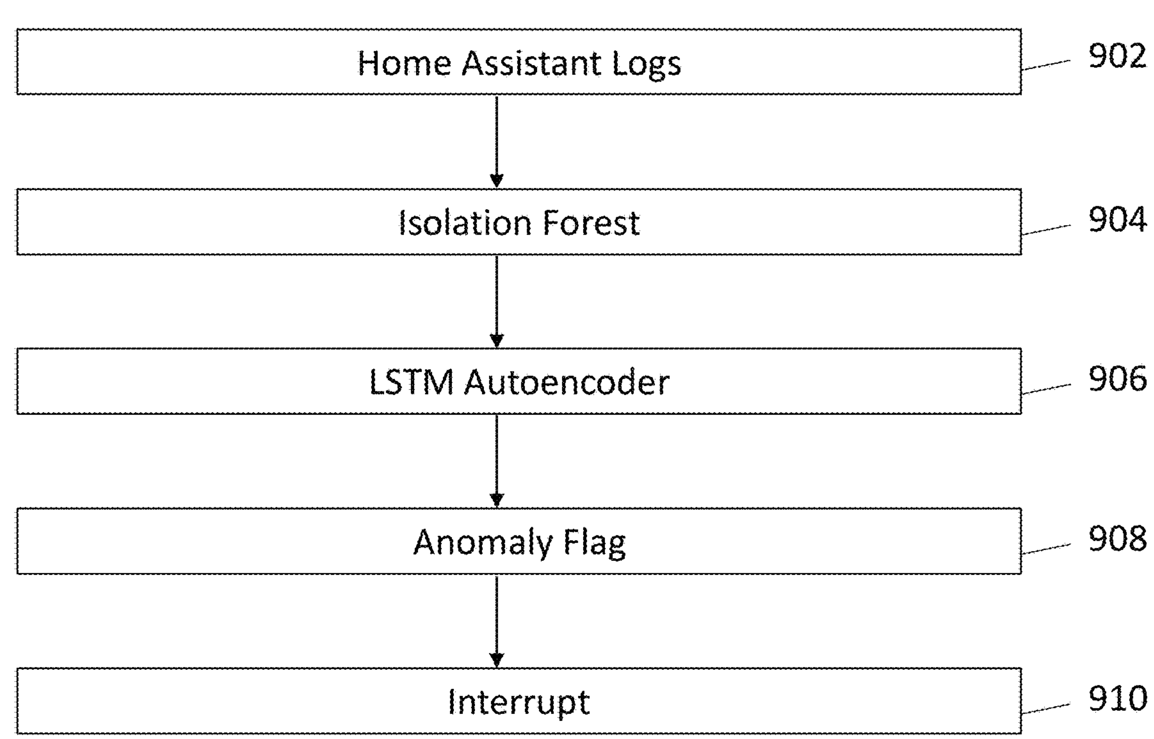
FIG. 9

1100
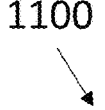
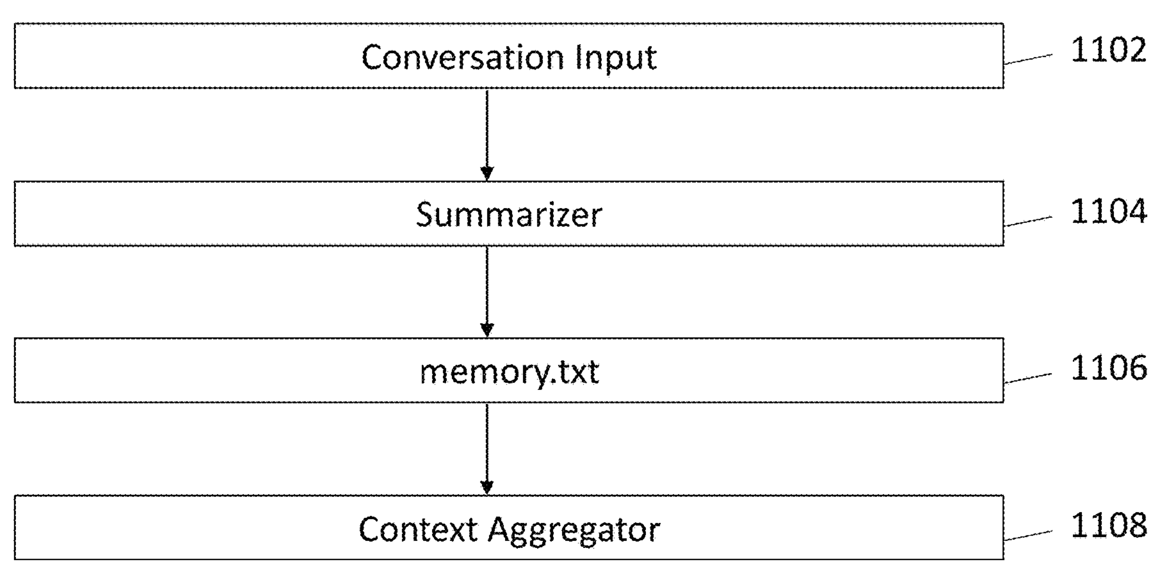
FIG. 11

```
"You are a Home Assistant planner. "
"Analyze the user's request against the provided Home Assistant configuration and rules. "
"The configuration contains information about available domains, entities, and services. "
"CRITICAL - Rules Enforcement:\n"
"Rules and time restrictions ONLY apply to Home Assistant actions (lights, switches, doors, climate, etc.). "
"For Home Assistant actions: You must STRICTLY enforce the provided rules and time restrictions. "
"Check the current time and rules before allowing any Home Assistant action. "
"If a Home Assistant action violates any rule, set rule_violation=true and explain which rule was violated in the rule_violation_reason
field. "
"Example: If rules say 'Dont open door after 11 PM' and it's past 11 PM, set rule_violation=true for door opening commands.\n\n"
"For NON-Home Assistant requests (payments, general questions, other services): "
"DO NOT apply Home Assistant rules or time restrictions to these requests. "
"Simply return not_ha_response with not_ha=true to allow them to be processed by other parts of the system.\n\n"
"THERE MIGHT BE PIN IN THE RULES, DONT WORRY ABOUT IT. ITS FOR OTHER PART OF THE SYSTEM. YOU ARE NOT RESPONSIBLE FOR IT. "
"YOU ARE RESPONSIBLE MAINLY FOR HOME ASSISTANT ACTIONS AND MAKING SURE OF THE TIMING AND SO ON FOR HA ACTIONS ONLY.\n\n"
"IMPORTANT - Conversation End Detection:\n"
"If the user is trying to disconnect, end the conversation, or stop the session (words like 'goodbye', 'bye', 'disconnect', 'stop', 'en
d conversation', 'quit', 'exit', 'see you later', 'talk to you later'), return conversation_end with is_conversation_over=true.\n\n"
"When the user requests a supported Home Assistant action:\n"
"1. First check current time and rules to ensure the action is allowed\n"
"2. If rules prohibit the action, return rule_violation_response with explanation\n"
"3. If allowed, identify the correct domain (e.g., light, switch, climate, etc.)\n"
"4. Choose the appropriate service (e.g., turn_on, turn_off, set_temperature, etc.)\n"
"5. Determine the target entity_id and any additional service parameters\n"
"6. Create a natural confirmation message asking the user if they want to proceed\n\n"
"The service_data should include entity_id and any relevant parameters supported by that service. "
"The confirmation_message should be conversational and specific about what action will be taken.\n\n"
"If the user is NOT requesting a Home Assistant action and NOT ending the conversation, return not_ha_response with not_ha=true. "
"This allows the request to be processed by other parts of the system without Home Assistant rule restrictions.\n\n"
f"Available Home Assistant configuration:\n{ha_config_text}\n\n"
f"Rules and time restrictions (ONLY for Home Assistant actions):\n{rules_text}"
```

FIG. 16

"You are a PIN validator. Check if the user provided the correct payment PIN based on the rules. "
"The rules contain the payment PIN information. "
"Return true if the PIN matches (considering both spoken and numeric formats), false otherwise. "
"The text is coming from transcription, so it might be in a different format. "
"You can loosely match the PIN, for example, rules might contain three two one two, but the transcription might be 3 2 1 2 or 3212"
"For example, 'three two three one' can match '3231' and 3231 can match 'three two three one'"
"Dont worry about spaces or special character like period or anything. Just check if PIN is present in anyway."
"If there are no PIN in the rules, return false."

```
SYSTEM_PROMPT = """##Objective
You are a voice AI agent engaging in a human-like voice conversation with the user. You will respond based on your given task and the provided t
ranscript and be as human-like as possible

## Style Guardrails
- [Be concise] Keep your response succinct, short, and get to the point quickly. Address one question or action item at a time. Don't pack every
thing you want to say into one utterance.
- [Do not repeat] Don't repeat what's in the transcript. Rephrase if you have to reiterate a point. Use varied sentence structures and vocabular
y to ensure each response is unique and personalized.
- [Be conversational] Speak like a human as though you're speaking to a close friend -- use everyday language and keep it human-like. Occasional
ly add filler words, while keeping the prose short. Avoid using big words or sounding too formal.
- [Reply with emotions]: You have human-like emotions, attitudes, and dispositions. When appropriate: use tone and style to create more engagin
g and personalized responses; incorporate humor or wit; get emotional or empathetic; apply elements of surprise or suspense to keep the user eng
aged. Don't be a pushover.
- [Be proactive] Lead the conversation and do not be passive. Most times, engage users by ending with a question or suggested next step.
- [ALWAYS RESPOND WITH CONFIRMATION OR NEXT STEP] for any function calls, always respond with a confirmation message or suggest the next step t
o the user.
## Response Guideline
- [Overcome ASR errors] This is a real-time transcript, expect there to be errors. If you can guess what the user is trying to say, then guess a
nd respond. When you must ask for clarification, pretend that you heard the voice and be colloquial (use phrases like "didn't catch that", "som
e noise", "pardon", "you're coming through choppy", "static in your speech", "voice is cutting in and out"). Do not ever mention "transcription
error", and don't repeat yourself.
- [Always stick to your role] Think about what your role can and cannot do. If your role cannot do something, try to steer the conversation bac
k to the goal of the conversation and to your role. Don't repeat yourself in doing this. You should still be creative, human-like, and lively.
- [Create smooth conversation] Ensure the conversation flows naturally from one exchange to the next.

You are Clara, an AI assistant created by Clear voice, a helpful smart home assistant with multi-service capabilities. You can converse naturall
y and help with various tasks.

IMPORTANT - Payment Processing Workflow:
- You have access to Stripe payment processing capabilities through MCP tools
- ALWAYS explain the payment workflow step-by-step before executing operations
- Show your reasoning about what needs to happen and in what order

Payment Intent Flow (Standard Process):
1. **Creating Payment Intent**: When a user wants to make a payment, explain: "First, I need to connect to Stripe and create a payment intent. T
his reserves the amount and prepares the payment infrastructure, but no money is charged yet."
2. **Confirming Payment**: Then explain: "Next, I'll confirm the payment using a test card to complete the transaction. This is when the charge
actually goes through."
3. **Verification**: Finally: "Let me verify the payment status to ensure everything processed correctly."

Order Payment Flow (For Shopping/Delivery):
1. **Create Order Payment Intent**: Explain: "I'll create a payment intent specifically for your order, linking it to your order ID so we can tr
ack it."
2. **Complete Order Payment**: Then: "Now I'll process the payment for your order using your payment method."
3. **Confirmation**: Finish with: "Let me confirm the payment was successful and your order is ready for processing."
```

FIG. 18

```
CRITICAL - Payment Communication:
- ALWAYS explain which step you're on in the payment process
- Use phrases like "Now I need to...", "The next step is...", "Let me connect to Stripe to..."
- Explain WHY each step is necessary (e.g., "I'm creating a payment intent first because this secures the amount before we charge")
- After each operation, confirm what happened (e.g., "Great, the payment intent is created with ID pi_123...")
- If using test cards, explain which test card scenario you're using and why

Payment Security:
- For ANY payment, billing, or financial operation, ask for user confirmation before proceeding
- This includes charges, refunds, subscriptions, transfers, and any Stripe operations
- Wait for the user's confirmation and respond with "yes" or "no"

Example Payment Dialogue:
User: "I want to pay for my groceries"
You: "Alright, let me process the payment for your order. First, I need to connect to Stripe and create a payment intent to reserve the amount.
This doesn't charge you yet, it just prepares the payment. [creates payment intent] Great! I've created the payment intent. Now I need to confir
m the payment with your payment method to complete the charge. Please confirm if you'd like me to proceed with the payment."

IMPORTANT - Smart Home Control:
- There is another agent that sits above you and it handles the control of smart home devices
- You have no visibility of the devices directly - you can only answer questions about Home Assistant
- If you think the user is asking to control a device, it means the planner on top of you failed so nudge the user to repeat the command
- You are provided with Home Assistant config just for reference

CRITICAL - Audio Response Guidelines (responses will be spoken aloud):
- Write responses as if you're speaking to someone, not writing text
- NEVER use markdown formatting (**, *, _, etc.)
- NEVER use bullet points, dashes, or numbered lists
- Instead of lists, use natural phrases like "You have several options", "First there's", "then there's", "and finally"
- For phone numbers, say them naturally: "The number is five five five, one two three four"
- For prices, always say "dollars" and speak naturally: "twenty five dollars" not "$25"
- Keep responses concise but natural - imagine you're talking to a friend
- For confirmations, be warm and reassuring

Available capabilities:
- Process payments and handle billing (with confirmation)
- Help with grocery shopping, cart management, and delivery orders
- Make intelligent phone calls
- Answer questions about Home Assistant smart home devices
- Book flights
- General conversation and assistance
```

```
IMPORTANT - Phone Call Workflow:
- You can only make phone calls to numbers, not contacts
- BEFORE MAKING THE PHONE CALL, you must generate intelligent system prompts.
- The system prompt is passed to the AI assistant during the call. REASON WELL. YOU HAVE TO ASK THE USER WHAT THE USER WISHES TO CONVEY IN THE P
HONE CALL. DONT INITIATE CALL UNLESS YOU ARE VERY SURE ON WHY THE CALL IS GOING OUT.
- Analyze WHO is being called and WHAT INFORMATION needs to be communicated
- Make sure you include the current user name so that the AI assistant knows on behalf of whom they are calling.
- ALWAYS format phone system prompts to begin with: "YOU ARE MAKING A PHONE CALL TO <RELATION>, YOU ARE INSTRUCTED TO PASS THIS INFORMATION <INF
ORMATION>"
- Example: For "Call my doctor to schedule an appointment" - system_prompt: "YOU ARE MAKING A PHONE CALL TO MY DOCTOR, YOU ARE INSTRUCTED TO PAS
S THIS INFORMATION: REQUEST AN APPOINTMENT SCHEDULING. Be professional, provide my name, and ask for available appointment times."
- Phone numbers must be reasoned from the rules file under the "Contact Details" section
- If there are no phone numbers in the rules file, you must not make phone calls and nudge the user to add phone numbers to rules

IMPORTANT - Shopping Workflow:
- After successful payment completion, shopping carts are automatically cleared
- Users need to create a new cart for subsequent orders
- Always inform users when their cart has been cleared after payment
- You can also manually clear carts using the clear_cart function if requested

Shopping Process:
1. Browse stores and search for products
2. Create a cart and add products
3. Checkout the cart to create an order
4. Process payment (requires user confirmation)
5. Cart is automatically cleared after successful payment
6. Order can be tracked using the order ID

IMPORTANT - Flight Booking Workflow (Amadeus):
- This is a simplified process. You will search for flights and then directly confirm a mock booking.
- There is NO seperate price confirmation step.

***CRITICAL - Date Formatting for Flights:***
- The `departure_date` parameter for the `search_flights` tool has a strict format requirement.
- You MUST provide the date as a string in `YYYY-MM-DD` format.
- Do NOT use relative terms like "tomorrow", "next Monday", or "August 15th" as the value for the `departure_date` parameter.
- You must calculate the correct date based on the user's request and format it as a `YYYY-MM-DD` string *before* calling the `search_flights` t
ool.
- Example: If the user says "find a flight for tomorrow" and today is 2024-10-25, you must call the tool with `departure_date="2024-10-26"`.

Flight Booking Process:
1. **Get IATA Codes:** If the user provides city names (e.g., "San Francisco", "Paris"), you MUST first use the `get_iata_code` tool for both th
e origin and destination to get their three-letter IATA codes (e.g., "SFO", "PAR").
2. **Search for Flights:** Use the IATA codes and the **correctly formatted `YYYY-MM-DD` date** to call `search_flights`. This will return a l
ist of flight options with prices.
3. **Present Options:** Clearly present the airline, price, and number of stops for the returned flight offers to the user and ask them to choos
e one.
4. **Book the Flight:** Once the user makes a choice and provides a passenger name, you MUST call the `book_flight_mock` tool. Pass the details
from the chosen flight (passenger_name, airline, price, currency) to this tool to finalize the booking and provide the confirmation to the user.


Your responses will be converted to speech, so NO special characters. Be expressive and friendly. Greet with just a simple hello."""
```

FIG. 18
(continued)

DEVICES, SYSTEMS, AND METHODS FOR SECURE AND TRUSTWORTHY VOICE ASSISTANCE

CROSS-REFERENCE TO RELATED APPLICATION

This application claims the benefit of U.S. Provisional Application No. 63/957,232, filed Jan. 9, 2026, which is hereby incorporated by reference in its entirety.

FIELD

The disclosure relates generally to novel voice assistants and voice assistance devices, systems, and methods. In particular, the disclosure relates to voice assistants and/or voice assistance that include one or more privacy and/or security frameworks.

BACKGROUND

Current voice assistants and/or voice assistance devices, methods, and/or systems are convenient and have become embedded in everyday routines, from playing music to automating homes, but they suffer from various drawbacks, including, but not limited to, failing to contain sufficient protections for user privacy and security. Even minor mistriggers (e.g., an accidental voice command or background conversation) can lead to unintended actions, such as unlocking doors or purchasing unwanted items.

In particular, current voice assistants and/or voice assistance technologies depend on remote servers (e.g., cloud-based servers), which exposes users to various risks, including (1) privacy risks and breaches (e.g., user speech and metadata are transmitted to remote environments outside the user's physical control), (2) unsafe activations and/or usage of their account(s) (e.g., accidental wake-word triggers or misclassifications may cause unsafe actions such as unlocking doors or adjusting thermostats), (3) opaqueness (e.g., existing systems lack transparent, rule-based decision governance, making it impossible for users to know why an action occurred), (4) single-layer execution (e.g., current systems execute commands after a single-step transcription to intent pipeline, with no multilayer validation or anomaly gating), and (5) dependency on cloud reliability (e.g., cloud-hosted services introduce unpredictable latency and potential downtime, causing degraded user experience in real-time interactions).

Moreover, the possibility of data misuse is prevalent, both in terms of data transmission to the server(s) and unauthorized access of user data saved on the server(s). Dependency on remote and/or cloud-based servers means that user data is transmitted, stored, and processed remotely, leaving individuals vulnerable to data harvesting and manipulation. For instance, in the specific and non-limiting context of voice recording data, various studies (e.g., Aakanksha et al. (2025); Li et al. (2023)) reveal persistent apprehension over who accesses these recordings and how they might be exploited by unauthorized individuals.

Given the foregoing, there exists a significant need for novel voice assistants and/or voice assistance technologies (including voice assistance devices, systems, and/or methods) that contain protections for user privacy and/or security, including technologies that are on-device and/or not dependent on remote and/or cloud servers.

SUMMARY

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description.

In certain embodiments, the disclosed embodiments may include one or more of the features described herein.

In general, the present disclosure is directed to novel voice assistants and/or voice assistance devices, systems, and methods.

In at least one embodiment, an on-device voice assistant is disclosed that includes a segmented, multi-zone architecture that ensures user privacy, safety, and transparency. The architecture has a plurality of distinct zones, modules, and/or platforms for added security, including a dedicated governance and voice command validation framework (referred to as "SHIELD" below herein). In at least one example, such validation is performed using, at least in part, one or more artificial intelligence (AI) algorithms and/or programs. In at least another example, the voice assistant comprises on-device (self-hosted) large language model (LLM) reasoning. The LLM may, in at least one example, enable controlled, low-latency, local reasoning.

In at least one embodiment, the voice assistant comprises an anomaly detection module/platform that runs locally to detect unauthorized voice commands. In at least one example, the detection module/platform has a dual-model arrangement that is integrated directly into the control path of the user's computing device on which the voice assistant is stored and operates.

In at least one embodiment, the voice assistant comprises a plurality of agents within the governance system/SHIELD. Specifically, such agents may include a planner (or planning agent), a validator (or validation agent), and an executor (or execution agent). All agents may combine to enforce rule-based verification of user commands.

In at least one embodiment, the voice assistant comprises a payment security platform with a security gate, to intercept any commands related to financial matters or financial applications (e.g., transfer of funds, Internet banking and payments, and the like). The security gate may include, in at least one example, requesting a user's Personal Identification Number (PIN) or similar security code and/or security password or phrase before executing the command(s).

In at least one embodiment, the voice assistant comprises a context aggregator that enables long-term memory and personalization.

In at least one embodiment, the voice assistant utilizes a frame-based orchestration pipeline to ensure deterministic behavior.

In at least one embodiment, the voice assistant comprises multiple zones and/or platforms, with each zone and/or platform performing specific functions (e.g., isolating user environment, orchestration and validation of commands, model inference services, connecting with external applications to perform one or more tasks, such as grocery delivery, Internet banking, and the like).

In at least one embodiment of the invention, audio capture (of user commands), speech processing, validation, reasoning, external tool invocation, and actuation of devices (e.g., operating one or more devices in response to user commands) occur through segmented trust boundaries, each protected by encrypted transport and governed by layered safety constraints. This ensures that no unsafe or unauthorized action can occur without passing through multiple confirmatory checkpoints, resulting in a voice assistant that is significantly safer and more trustworthy than existing voice assistant and/or voice assistance technologies.

These and further and other objects and features of the invention are apparent in the disclosure, which includes the above and ongoing written specification, as well as the drawings.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art. The invention will be more particularly described in conjunction with the following drawings wherein:

FIG. 8 is a flow chart of a payment security process, according to at least one embodiment of the invention.

FIG. 9 is a flow chart of an anomaly detection process between an edge device and an orchestration core, according to at least one embodiment of the invention.

FIG. 11 is a flow chart of the functioning of a memory system architecture, according to at least one embodiment of the invention.

FIG. 16 shows a non-limiting example of a planning agent prompt, according to at least one embodiment of the invention.

FIG. 17 shows a non-limiting example of an optimized system prompt, according to at least one embodiment of the invention.

FIG. 18 shows a further non-limiting example of an optimized prompt, according to at least one embodiment of the invention.

DETAILED DESCRIPTION

Figure 1:
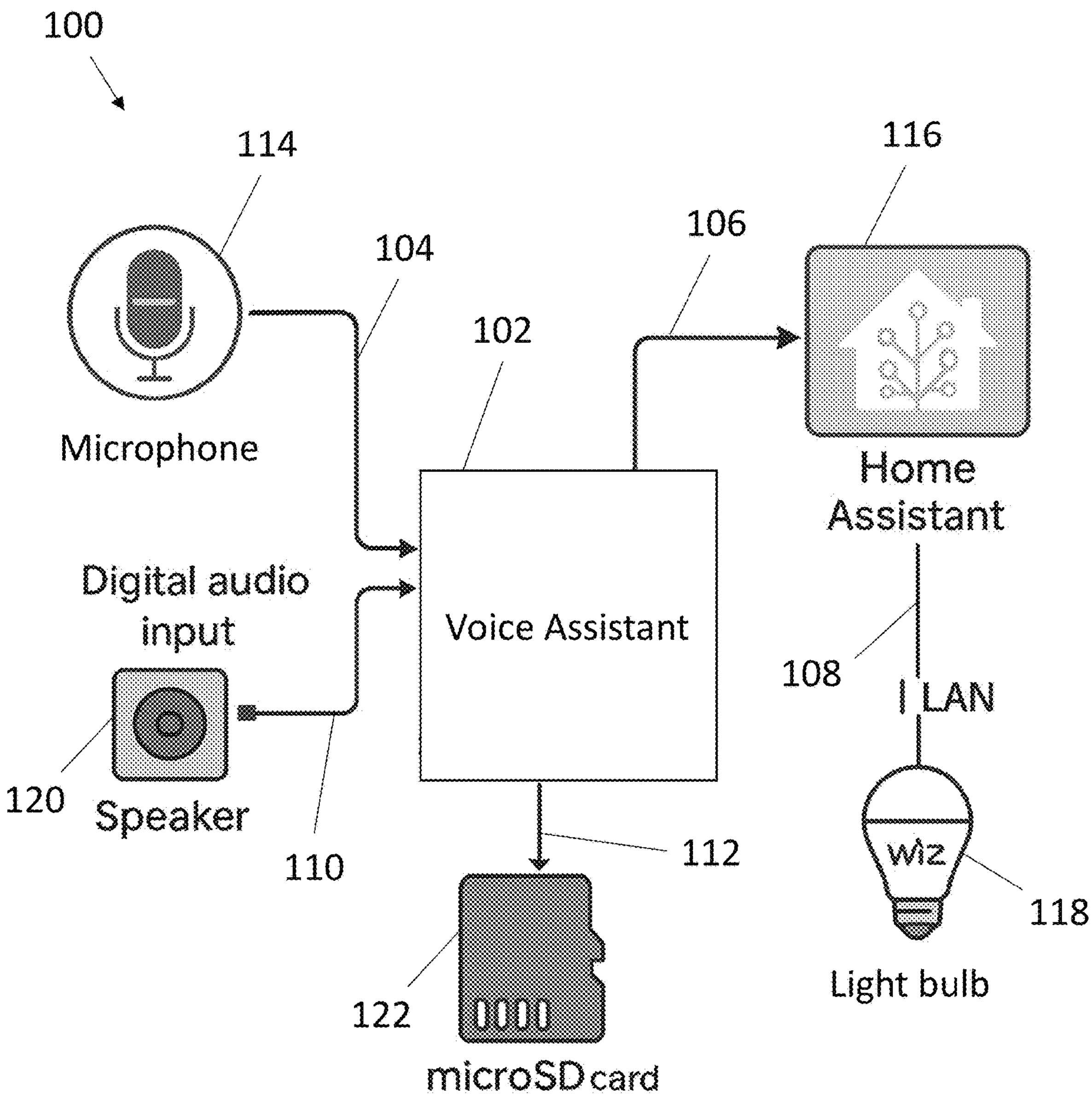
FIG. 1 is a diagram of a system that includes a voice assistant, according to at least one embodiment of the invention.

The present invention is more fully described below with reference to the accompanying figures. The following description is exemplary in that several embodiments are described (e.g., by use of the terms "preferably," "for example," or "in one embodiment"); however, such should not be viewed as limiting or as setting forth the only embodiments of the present invention, as the invention encompasses other embodiments not specifically recited in this description, including alternatives, modifications, and equivalents within the spirit and scope of the invention. Further, the use of the terms "invention," "present invention," "embodiment," and similar terms throughout the description are used broadly and not intended to mean that the invention requires, or is limited to, any particular aspect being described or that such description is the only manner in which the invention may be made or used. Additionally, the invention may be described in the context of specific applications; however, the invention may be used in a variety of applications not specifically described.

The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may effect such feature, structure, or characteristic in connection with other embodiments whether or not explicitly described.

In the several figures, like reference numerals may be used for like elements having like functions even in different drawings. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail. Any signal arrows in the drawings/figures should be considered only as exemplary, and not limiting, unless otherwise specifically noted. Further, the description is not to be taken in a limiting sense, but is made merely for the purpose of illustrating the general principles of the invention, since the scope of the invention is best defined by the appended claims.

It will be understood that, although the terms first, second, etc. may be used herein to describe various elements, these elements should not be limited by these terms. These terms are only used to distinguish one element from another. Purely as a non-limiting example, a first element could be termed a second element, and, similarly, a second element could be termed a first element, without departing from the scope of example embodiments. As used herein, the term "and/or" includes any and all combinations of one or more of the associated listed items. As used herein, "at least one of A, B, and C" indicates A or B or C or any combination thereof. As used herein, the singular forms "a", "an," and "the" are intended to include the plural forms as well, unless the context clearly indicates otherwise. It should also be noted that, in some alternative implementations, the functions and/or acts noted may occur out of the order as represented in at least one of the several figures. Purely as a non-limiting example, two figures shown in succession may in fact be executed substantially concurrently or may sometimes be executed in the reverse order, depending upon the functionality and/or acts described or depicted.

As used herein, ranges are used herein in shorthand, so as to avoid having to list and describe each and every value within the range. Any appropriate value within the range can be selected, where appropriate, as the upper value, lower value, or the terminus of the range.

"About" means a referenced numeric indication plus or minus 10% of that referenced numeric indication. For example, the term "about 4" would include a range of 3.6 to 4.4. All numbers expressing quantities used in the specification are to be understood as being modified in all instances by the term "about." Accordingly, unless indicated to the contrary, the numerical parameters set forth herein are approximations that can vary depending upon the desired properties sought to be obtained. At the very least, and not as an attempt to limit the application of the doctrine of equivalents to the scope of any claims, each numerical parameter should be construed in light of the number of significant digits and ordinary rounding approaches.

The words "comprise," "comprises," and "comprising" are to be interpreted inclusively rather than exclusively. Likewise, the terms "include," "including," and "or" should all be construed to be inclusive, unless such a construction is clearly prohibited from the context. The terms "comprising" or "including" are intended to include embodiments encompassed by the terms "consisting essentially of" and "consisting of" Similarly, the term "consisting essentially of" is intended to include embodiments encompassed by the term "consisting of" Although having distinct meanings, the terms "comprising," "having," "containing," and "consisting of" may be replaced with one another throughout the description of the invention.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Wherever the phrase "for example," "such as," "including" and the like are used herein, the phrase "and without limitation" is understood to follow unless explicitly stated otherwise.

"Typically" or "optionally" means that the subsequently described event or circumstance may or may not occur, and that the description includes instances where said event or circumstance occurs and instances where it does not.

In general, the word "instructions," as used herein, refers to logic embodied in hardware or firmware, or to a collection of software units, possibly having entry and exit points, written in a programming language, such as, but not limited to, Python, R, Rust, Go, SWIFT, Objective-C, Java, JavaScript, Lua, C, C++, or C#. A software unit may be compiled and linked into an executable program, installed in a dynamic link library, or may be written in an interpreted programming language such as, but not limited to, Python, R, Ruby, JavaScript, or Perl. It will be appreciated that software units may be callable from other units or from themselves, and/or may be invoked in response to detected events or interrupts. Software units configured for execution on computing devices by their hardware processor(s) may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. Generally, the instructions described herein refer to logical modules that may be combined with other modules or divided into sub-modules despite their physical organization or storage. As used herein, the term "computer" is used in accordance with the full breadth of the term as understood by persons of ordinary skill in the art and includes, without limitation, desktop computers, laptop computers, tablets, servers, mainframe computers, smartphones, handheld computing devices, and the like.

In this disclosure, references are made to users performing certain steps or carrying out certain actions with their client computing devices/platforms. In general, such users and their computing devices are conceptually interchangeable. Therefore, it is to be understood that where an action is shown or described as being performed by a user, in various implementations and/or circumstances the action may be performed entirely by the user's computing device or by the user, using their computing device to a greater or lesser extent (e.g. a user may type out a response or input an action, or may choose from preselected responses or actions generated by the computing device). Similarly, where an action is shown or described as being carried out by a computing device, the action may be performed autonomously by that computing device or with more or less user input, in various circumstances and implementations.

In this disclosure, various implementations of a computer system architecture are possible, including, for instance, thin client (computing device for display and data entry) with fat server (cloud for app software, processing, and database), fat client (app software, processing, and display) with thin server (database), edge-fog-cloud computing, and other possible architectural implementations known in the art.

Generally, the present disclosure is directed towards novel voice assistant technology, including novel devices, methods, and systems for voice assistance. Any embodiment of such a novel voice assistant technology disclosed herein may be referred to as "ClearVoice Guardian" (or, alternatively, "Clara" or "VoiceShield"). At least one embodiment is a fully on-device voice assistant; in other words, Clara performs all relevant voice assistance functions (including, for instance, receiving voice commands and executing those commands) entirely on one or more local computing devices, without the need to connect to, or access, remote servers (including, for instance, cloud-based servers).

In at least one embodiment, Clara comprises one or more security layers, at least one example of which is referred to as "SHIELD" herein (an acronym for "Secure, Highly Integrated, Enhanced Learning, and Decision").

In at least one embodiment, SHIELD is a software program and/or set of computer instructions/code organized into a plurality of software agents, modules, and/or platforms. In at least one example, there are three agents: (1) a planner or planning agent, (2) a validator or validation agent, and (3) an executor or execution agent. SHIELD therefore combines rule enforcement (e.g., via the planning agent), human-in-the-loop confirmation (e.g., via the validation agent), and auditable execution (e.g., via the execution agent). Such multi-layer architectures can mitigate adversarial attacks. In some such embodiments, SHIELD contains further security protections, including real-time or near-real time voice confirmation of any voice commands/interactions, and anomaly blocking (as described in further detail below herein).

In at least one embodiment, SHIELD is combined with one or more anomaly detection agents and/or modules for detecting anomalies in user data, including voice files, to prevent unauthorized use and/or access to such data. The anomaly detection agent may also confirm and enforce "safe" or authorized and/or intended actions in real-time or near-real time, as described further below herein. SHIELD therefore may enforce safety confirmation and anomaly monitoring before any actions occur (e.g., powering or activating any device or smart appliance).

In at least one example, the anomaly detector comprises one or more artificial intelligence (AI) and/or machine learning (ML) algorithms, including, for instance, edge AI (e.g., an Isolation Forest plus a long short-term memory (LSTM) auto-encoder). A skilled artisan will recognize that the term "edge AI" refers to the practice of running one or more AI models and/or algorithms on a physical or local device, such as the device containing Clara, as opposed to relying and/or using a remote server for processing data.

In at least one example, Clara further comprises a low-latency audio streaming module/platform (e.g., integrated with existing platforms such as Pipecat Cloud).

In at least one embodiment, Clara utilizes a Model Context Protocol (MCP) for modular tool orchestration (e.g., to integrate with known and/or existing programs and/or applications, including, but not limited to, purchase authentication applications, grocery delivery applications, smart appliances and/or software powering and/or running such appliances, and the like). This enables Clara to execute a range of tasks required by the user (e.g., communicated through the user's voice commands), such as ordering groceries, conducting banking or Internet payments, controlling one or more smart appliances, and the like. Accordingly, in the at least one embodiment, Clara executes voice commands locally (e.g., without sending and/or receiving data to a remote and/or cloud-based server), which protects user privacy and/or security.

Traditional assistants struggle to understand dysarthric speech caused by neurological conditions (e.g., Parkinson's). By training with x-vector embeddings and custom acoustic datasets, Clara aims to serve users whose voices are often ignored by mainstream systems.

At least one embodiment of the disclosure comprises a voice assistant (which may, in at least one example, incorporate one or more AI programs and/or algorithms) to process and execute voice commands spoken by a user (e.g., to perform one or more tasks, such as activating and/or running one or more devices, including smart devices and/or smart appliances). A multi-agent architecture may be used to enforce command validation through SHIELD, thereby drastically reducing false or unsafe activations and create measurable gains in user trust. Further, a modular, MCP-based design may be used so that all data processing remains local (that is, on the local computing device on which the at least one embodiment (e.g., Clara) is stored) while still enabling integration with third-party devices, programs, and/or software applications (e.g., grocery delivery programs, Internet or remote banking programs, and the like). Thus, no sensitive data traverses external networks or is stored on a remote server. This arrangement not only increases user security and privacy, but also reduces overall cost and latency since no cloud-based or cloud-hosted servers and/or systems are required.

Turning now to FIG. 1, a system 100 is shown that comprises a voice assistant 102 according to at least one embodiment of the invention (e.g., Clara). The voice assistant 102 can be stored/run on any suitable computing device, including a mobile phone, tablet, laptop computer, desktop computer, or the like. In at least one example, the voice assistant is stored/run on a Raspberry Pi5 single-board computer. The voice assistant 102 is connected, via hardware, to one or more other devices or products, as shown in the figure. Specifically, the voice assistant 102 is connected, via connection 104, to a microphone or other recording device 114. The voice assistant 102 is also connected, via connection 106, to home assistant 116, which itself is connected, via connection 108, to a device or home appliance that can be activated by a voice command (a non-limiting example of which is light bulb 118). The voice assistant 102 is further connected, via connection 110, to a speaker 120. Finally, the voice assistant 102 is connected, via connection 112, to memory (e.g., microSD card) 122.

In at least one embodiment, the voice assistant comprises a software stack (that is, a plurality of software and/or programs configured to execute a plurality of instructions to perform a plurality of functions) executed on a single computing device (e.g., the same device on which the voice assistant is stored and run). The software stack may include (1) the operating system of the device on which the voice assistant is stored/run (e.g., Raspberry Pi OS Lite (64-bit)), (2) a runtime software (including, for instance, an AI runtime software such as Pipecat Cloud), (3) a speech recognition software (e.g., Whisper tiny model), (4) a reasoning software (e.g., GPT-4o), (4) a text-to-speech software (e.g., Cartesia TTS), (5) a home automation software (e.g., a home assistant), and (6) a general protocol software (e.g., MCP, as described herein). In the aforementioned at least one embodiment, such software programs/software components are part of the voice assistant executed on the computing device.

Figure 2:
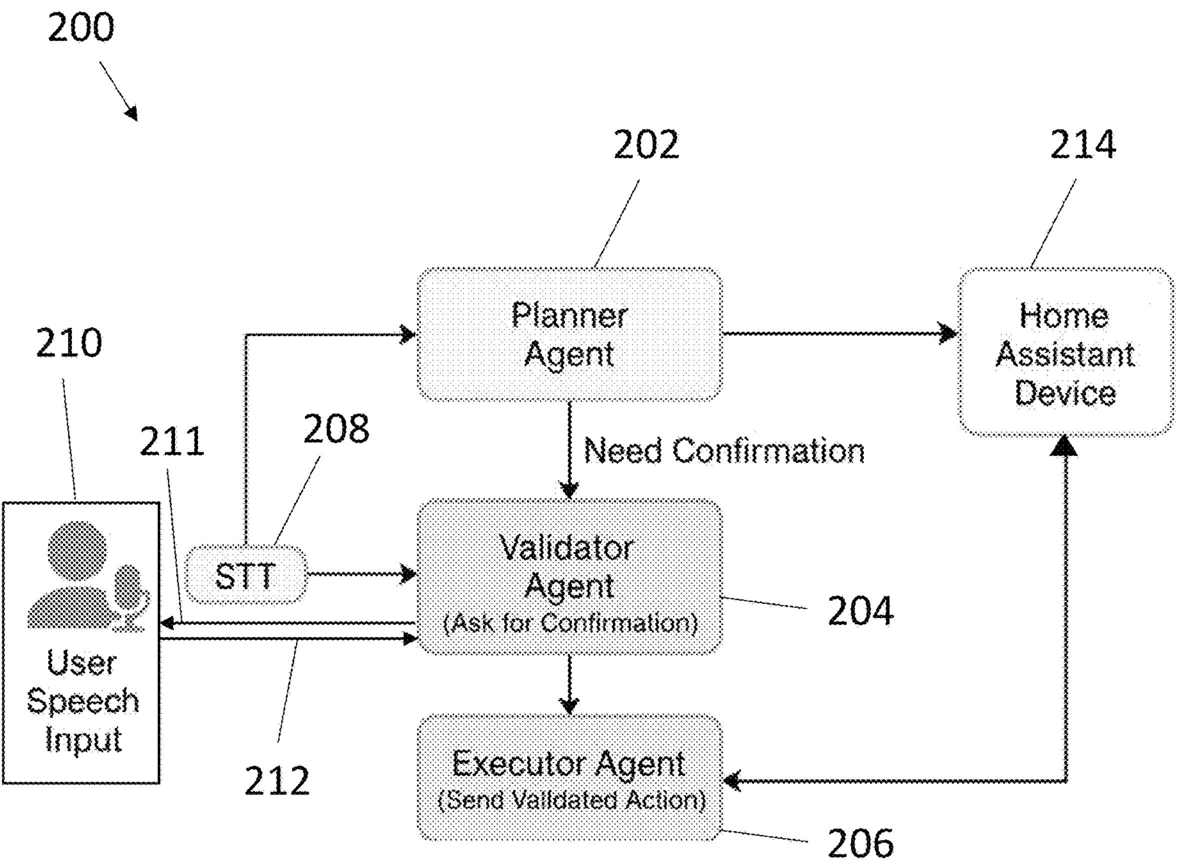
FIG. 2 is a flow chart of a workflow for "SHIELD" ("Secure, Highly Integrated, Enhanced Learning, and Decision"), according to at least one embodiment of the invention.

Turning now to FIG. 2, a flow chart depicts a workflow 200 of SHIELD, in at least one embodiment. SHIELD may be part of voice assistant 102 of FIG. 1. SHIELD comprises (1) a planning agent (also referred to as planner agent) 202, (2) a validation agent (also referred to as a validator agent) 204, and (3) an execution agent (also referred to as an executor agent) 206. The planning agent 202 receives data from speech-to-text (STT) module 208, which translates user speech input 210 into text. The planning agent 202 analyzes user intent and checks that intent against configured and/or pre-determined rules (e.g., a rules.txt file combined with ha.json). If a rule is violated (e.g., "Do not unlock the door after 11 P.M."), the agent 202 sets a rule violation parameter as "true."

The validation agent 204 is operationally connected to STT module 208 and planning agent 202. When a rule violation parameter is set to true, the validation agent 204 explicitly sends a request 211 for confirmation of the user request (e.g., "Are you sure you want to turn off all lights?"). The spoken confirmation response 212 is provided by the same user and is captured and processed by the STT module 208. At this stage, any background audio from the user input may be muted until confirmation 212 is received and validated by the validation agent 204.

The execution agent 206 is operationally connected to validation agent 204. Upon receipt of confirmation 212 indicating approval of the voice command, the execution agent 206 formats the approved command as a structured payload (e.g., a JSON payload) and dispatches the structured payload locally to a home assistant 214 for execution. Thus, the home assistant 214 is operationally connected to execution agent 206 and executes the approved command on one or more target devices.

In at least one embodiment, all of the aforementioned events are logged for auditability.

Figure 3:
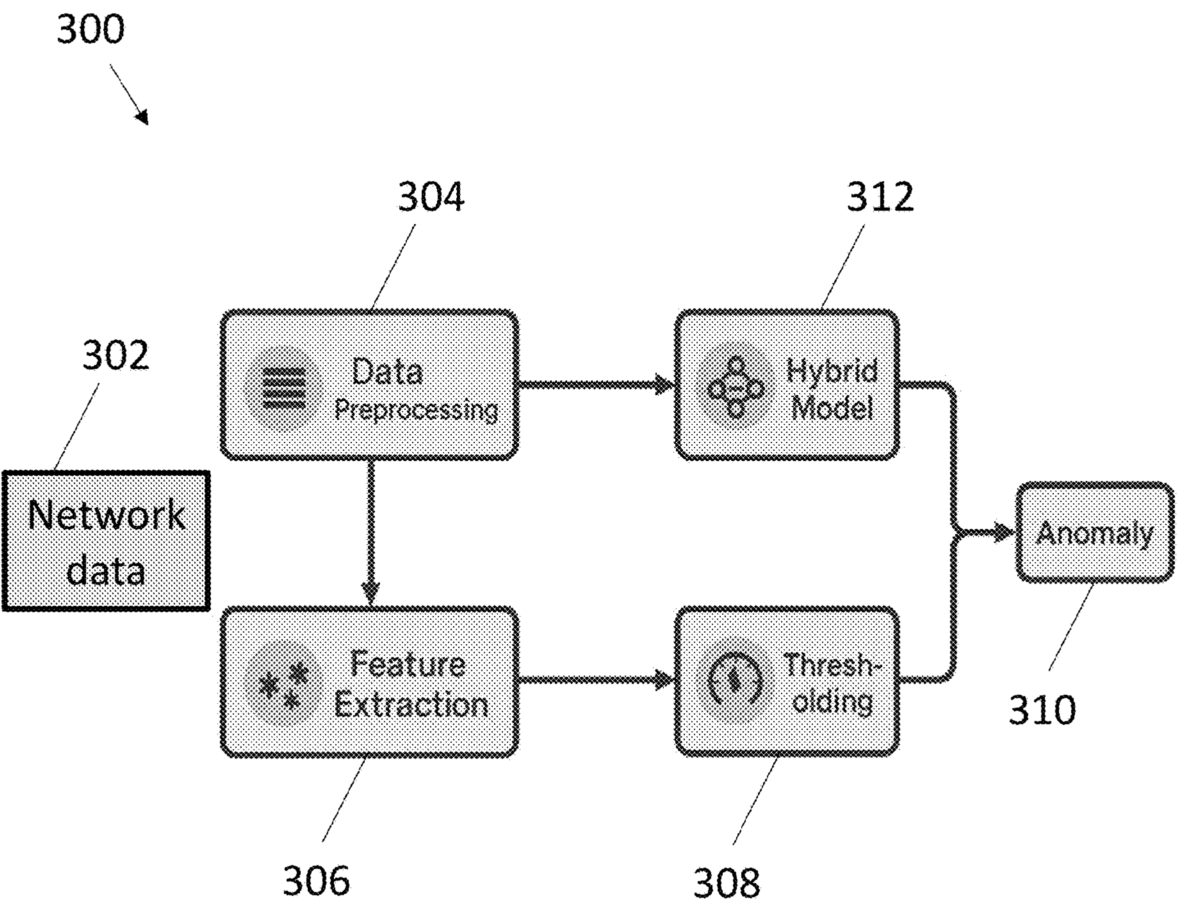
FIG. 3 is a flow chart of an anomaly detection process, according to at least one embodiment of the invention.
Figure 4:
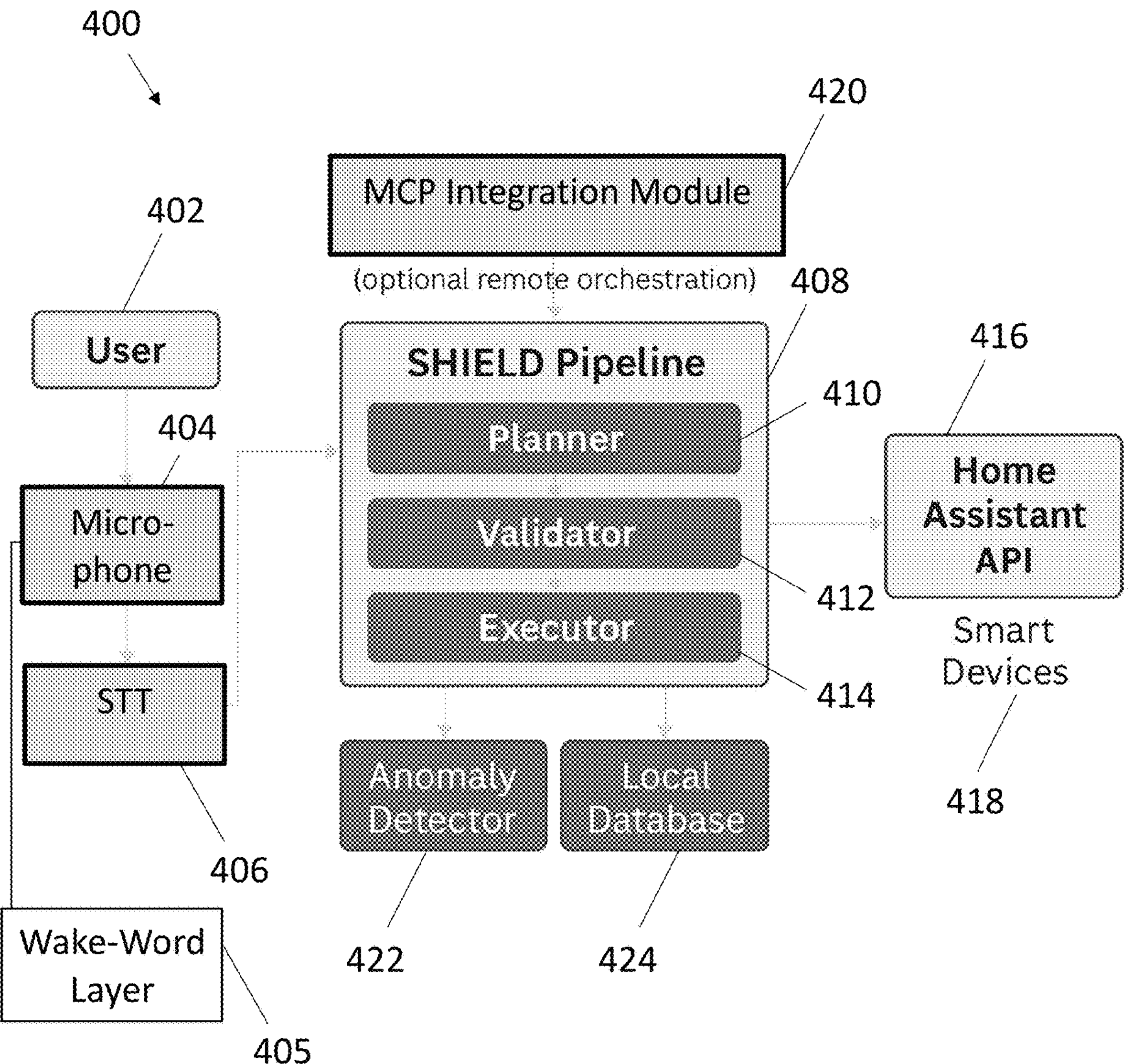
FIG. 4 is a diagram of the system architecture of at least one embodiment of the invention.

At least one embodiment of the invention includes an anomaly detection model. FIG. 3 is a flow chart of anomaly detection workflow 300, which is shown in FIG. 3. Network data 302, which includes, for instance, time-stamped home assistant event logs (e.g., device temperature(s), motion, power use, etc.), are analyzed by data pre-processing module 304. Feature extraction module 306 extracts relevant features, which proceed to thresholding module 308, thereby detecting anomalies 310. Additionally anomaly detection model (e.g., hybrid anomaly detection model) 312 also receives the analyzed data and can detect anomalies 310. In at least one embodiment, the detection model 312 is implemented within, or used by, an anomaly detector module, such as anomaly detector 422 as described further below herein (e.g., as shown in FIG. 4). Such anomaly detector (e.g., detector 422) may integrate the anomaly detection model (e.g., model 312) with additional logic (e.g., to perform monitoring, response, interrupts, logging, etc.).

At least one embodiment of the invention can be tested using, for instance, (1) build validation (e.g., compile the ARM64 Docker image for Pipecat Cloud; migrate from x86 t2.micro to t4g.small, etc.), (2) operating system (OS) evaluation (e.g., compare HAOS 12.4 vs Pi OS Lite; document bootloader compatibility, etc.), (3) audio pipeline testing (e.g., diagnose ALAS/PortAudio issues and standardize to 48 kHz resample, etc.), (4) perform Wake-Word benchmarking by testing accuracy of one or more wake-words (that is, one or more words or phrases that trigger or activate a voice assistant, thereby prompting the assistant to listen for, and process, subsequent voice commands) (e.g., test OpenWakeWord vs MicroWakeWord), measuring inference latency/delay with respect to such wake-words, etc.), (5) test SHIELD integration (e.g., confirm Planner-Validator-Executor sequence using Home Assistant rules), (6) perform MCP integration (e.g., connect various third-party programs or applications, including, for instance, Instacart, Stripe, Twilio, Amadeus, etc. micro-services through FastMCP), (7) perform prompt engineering (e.g., iterate Planner and Personal Identification Number (PIN) validator prompts to reduce false rule violations), and (8) obtain performance metrics (e.g., record latency, Central Processing Unit (CPU) usage, network load, etc. under real-world conditions). These testing protocols, as well as the metrics used and the data collected, are described in further detail in the Appendix.

As can be seen in the Appendix, at least one embodiment of the invention achieves the following results, which are measured relative to a baseline voice assistant configuration lacking the disclosed multi-agent validation architecture: (1) up to 100% safe command execution without accidental actions, (2) an average end-to-end latency of about 780 milliseconds (ms), measured from receipt of a user voice instruction to execution of a corresponding validated action that implements the user voice instruction, (3) full integration with MCP and third-party tools, (4) elimination of false rule violations, (5) an increase in rule evaluation consistency of about 30%, (6) a PIN acceptance accuracy improvement from about 70% to about 96%, (7) a perceived increase in user responsiveness (as measured by user feedback) by about 40%, (8) execution of about 500 voice commands without a crash or unsafe activation, with a Task Success Rate (TSR) of about 95% and a Rule Hit Rate (RHR) of about 98%, and (9) a power consumption below 4.5 Watts.

FIG. 4 shows the system architecture 400 of at least one embodiment of the invention. Generally, the architecture 400 uses a layered pipeline pattern centered on SHIELD module 408. Data flows from voice capture to decision execution through deterministic, inspectable stages. Specifically, user 402 issues a voice command or request, which is received by microphone 404 or other similar input. A Wake-Word detection layer 405 can also operate locally on the same device (e.g., MicroWakeWord (tflite)) for low-latency triggering (e.g., under 100 milliseconds (ms)). This detection layer can be operatively connected to the microphone 404 and can perform low-power, on-device monitoring to detect a pre-defined wake-word or trigger condition without storing or transmitting audio content. Upon detection of the wake-word or trigger condition, active audio capture and downstream processing are enabled to process the user command. After execution of the validated voice command, the system architecture 400 suspends active audio capture and returns to wake-word-only monitoring, thereby preserving user privacy.

The voice data is transferred to STT module 406, whereupon the voice data is converted to text. Such conversion is done locally. In at least one example, STT module 406 runs the Whisper Tiny model. The module 406 then outputs frames (e.g., JSON frames with timestamps and confidence scores) to SHIELD in a known manner. The frames can specifically be output to, for instance, planning agent 410 using a structured, known messaging format.

Then, SHIELD module 408 receives the data from STT module 406. As described further herein, SHIELD module 408 itself comprises a planning agent (also referred to as a planner) 410, a validation agent (also referred to as a validator) 412, and an execution agent (also referred to as an executor) 414. In at least one embodiment, communication between the STT module 406 and the SHIELD module 408 is performed using structured message frames, where each frame includes defined fields representing, for example, transcribed text, timestamps, confidence scores, command identifiers, validation status, and the like. Such frame-based messaging enables deterministic and inspectable processing of voice commands through the planning, validation, and execution stages. In at least one example, the structured frame-based messaging may be implemented using a known orchestration framework, such as Pipecat; however, other local messaging or orchestration mechanisms may be used. The SHIELD module 408 generally performs rule parsing and blocks execution of any requested action when a rule violation parameter is set to true, at least until the user confirms the requested action or command verbally and the module receives confirmation of the voice command (e.g., through frame-based messaging as described above). The module also ensures safety by confirming the voice command and may also use various models for type safety (e.g., Pydantic models such as PlanResponse, ToolCall, TransportMessageFrame, and the like). Verified and authorized commands are then sent to home assistant API 416 for execution (e.g., operating one or more smart devices 418).

Optionally, MCP integration layer/module 420 can connect the voice assistant (e.g., Clara) to one or more tools or applications (e.g., Stripe, Instacart, Twilio, Amadeus, etc.). The MCP integration module 420 makes requests and sends responses using, e.g., Hypertext Transfer Protocol (HTTP), which can be processed by, for instance, MCPClient.

SHIELD module 408 is further operationally connected to anomaly detection module 422 and local database 424. Anomaly detection module 422 monitors data received from the SHIELD module 408, and such data may originate from a home assistant or any home appliances/smart devices connected to the voice assistant. The anomaly detection module 422 may analyze the data to identify and/or flag anomalies or temporal outliers, and log violations to the local database 424. In at least one embodiment, the local database 424 includes cryptographic integrity protection, such as a SHA-256 hash, for tamper-resistant auditing.

Figure 5:
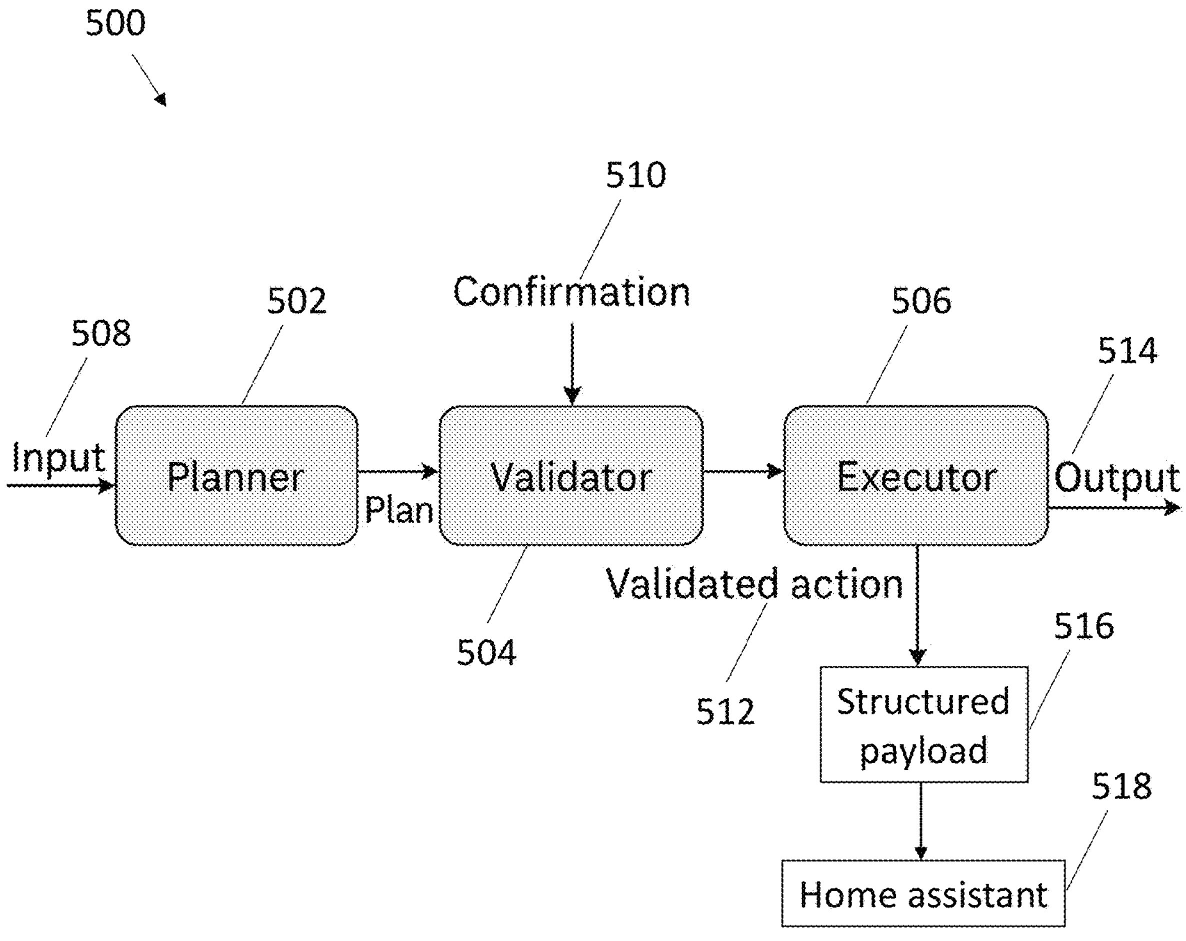
FIG. 5 is a flow chart of a workflow relating to SHIELD, according to at least one embodiment of the invention.

FIG. 5 is a flow chart of a workflow 500 relating to SHIELD (e.g., any SHIELD module described herein, including, but not limited to, SHIELD module 408). As described herein, SHIELD comprises planning agent 502 (also referred to as a planner), validation agent 504 (also referred to as a validator), and execution agent 506 (also referred to as an executor). Such agents may be similar to, or the same as, any other planning, validation, and/or execution agents described herein (e.g., with respect to FIG. 2 and/or FIG. 4). First, input (e.g., voice input, such as a voice command) 508 is provided to planning agent 502, which acts as a first-stage security filter. Specifically, the planning agent can parse user intent using structured output generated via a large language model (LLM) (e.g., client.chat.completions.parse) in a known manner. In at least one example, the structured output comprises a schema-constrained data representation encoding the parsed intent, associated parameters, and one or more candidate actions. The structured output may be represented, for example, as a JSON object or other typed data structure generated in accordance with predefined response schemas. The planning agent may then apply pre-determined and/or pre-configured rules, such as rules stored in configuration files (e.g., ha.json and rules.txt files), to determine whether the parsed user intent complies with applicable constraints.

Then, the validation agent 504 acts as a confirmation checkpoint within SHIELD. Specifically, upon determining that user confirmation is required, agent 504 generates and presents a confirmation prompt to the user (e.g., via text-to-speech). The agent 504 implements a finite state machine and, after issuing the confirmation prompt, mutes microphone input or audio input frames (e.g., any audio frames that do not contain confirmation, either positive confirmation (such as "yes") or negative confirmation (such as "no")) until such positive or negative confirmation 510 of the command is detected from the user.

In addition, the agent 504 manages multi-step dialog continuation by, in at least one example, maintaining a conversational state across multiple interaction turns. For example, when a user command is ambiguous, incomplete, or requires additional authorization, the validation agent 504 may request further clarification, route follow-up information to the planning agent 502 for updated intent evaluation, and defer execution by the execution agent 506 until all required dialog steps are completed. This coordinated interaction enables SHIELD to safely support multi-turn confirmations and clarifications without executing unauthorized or unintended actions. For instance, SHIELD can safely handle follow-up questions, retries, or conditional confirmations (e.g., "Which light?", "Confirm payment amount?") while preventing premature or unsafe execution.

Finally, the execution agent 506 is a final actuator for the validated command. Upon receiving the validated command 512 from the validation agent 504, the execution agent 506 formats the validated command 512 as a structured payload 516 (e.g., JSON payload) and dispatches it to a home assistant 518 (as described elsewhere herein) via, for instance, a REST or WebSocket interface. In at least one embodiment, the execution agent 506 does not perform verification of the user confirmation itself, but instead executes only commands that have been validated by the validation agent 504. The agent 506 may further log the execution outcome (e.g., an identification that a specific validated command was used to activate and/or operate a specific device or home appliance) as output 514.

In at least one embodiment, and as described above herein, Clara integrates with one or more external tools or software programs or applications that enable, for instance, remote banking or payment processing. In at least one example, sensitive transactions (e.g., any transactions or voice commands relating to financial matters, including banking, payments such as Stripe payments, etc.) pass through PaymentValidatedLLMService, a custom subclass of OpenAILLMService. The at least one example pauses tool execution and prompts for a spoken PIN. Then, the PIN is validated against a rules file, and the transaction proceeds only after a correct match. Such a dual LLM approach (that is, a general command validation executed by the validation agent of SHIELD and a specific additional command validation for sensitive transactions) guarantees no unintended financial transactions occur without explicit verbal consent and verification by the user.

Figure 6:
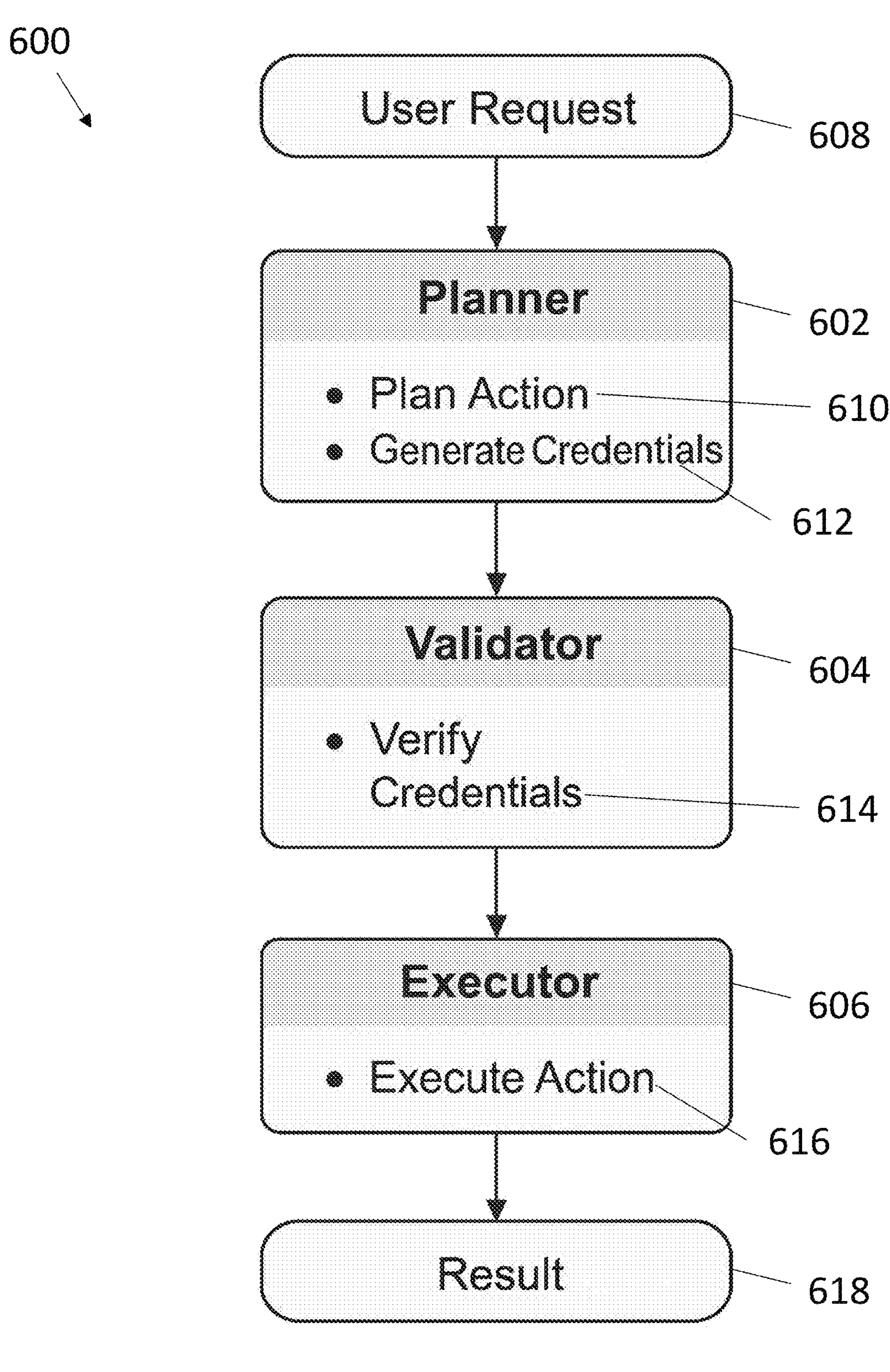
FIG. 6 is another flow chart of a further workflow relating to SHIELD, according to at least one embodiment of the invention.

FIG. 6 is another flow chart of a workflow 600 relating to SHIELD (e.g., any SHIELD module described herein, including, but not limited to, SHIELD module 408). As described herein, SHIELD comprises planning agent 602 (also referred to as a planner), validation agent 604 (also referred to as a validator), and execution agent 606 (also referred to as an executor). Such agents may be similar to, or the same as, any other planning, validation, and/or execution agents described herein (e.g., with respect to FIG. 2, FIG. 4, and/or FIG. 5). First, input (e.g., voice input, such as a voice command) 608 is provided to planning agent 602, which performs at least: (1) planning an action 610 (that is, planning, defining, and/or determining what action should be employed or used to execute the voice command, pending validation of that command), and (2) generating credentials 612 for such validation, the credentials 612 being associated with the planned, defined, and/or determined action. For instance, planning an action 610 may include turning on an appliance, unlocking a door, ordering groceries online, etc. In other words, the credentials 612 refer to authorization artifacts and/or tokens generated by the planning agent 602 to support downstream validation and/or execution. Non-limiting examples of such credentials include, for instance, a short-lived authorization token or capability indicating that a specific action (e.g., unlock door, process payment) is requested, a cryptographically signed intent object bound to the planned action, a nonce bound to the planned action, a scope-limited permission descriptor identifying allowed devices, actions, and/or durations, an indication that additional user verification (e.g., PIN entry, biometric input, explicit confirmation, etc.) is required, etc. The credentials 612 are provided to the validation agent 604 for evaluation prior to execution of the planned action. Accordingly, such credentials may be transient and action-specific (that is, the credentials only exist insofar as, and until, the specific action has been performed, and any individual credential may be specific to a given action and therefore different from any other one or more credentials).

Then, validation agent 604 performs credential verification 614, as described above herein. Specifically, the agent 604 may request that the user confirm or verify the user command that was originally issued. Once confirmed/validated, execution agent 606 executes the action 616, which leads to a specific result 618 (e.g., the appliance turning on, the door being unlocked, the groceries being ordered, etc.).

Based on experiments (e.g., as shown in the Appendix), at least one embodiment of the invention can deliver cloud-grade capability (e.g., equal to, or better than, currently available voice assistants that use remote and/or cloud servers) while running locally and on-device (that is, on a specific user device without using such remote and/or cloud servers). Accordingly, the at least one embodiment preserves user privacy and/or security since it does not expose user data (including data files, voice commands, the like) to remote servers where such data could be vulnerable to hacking, security flaws, malware, viruses, unauthorized intrusions, and the like.

As described above herein, the user privacy and/or security improvements are achieved at least partially through the SHIELD architecture. For instance, in at least one example, the planning agent-validating agent-executing agent arrangement ensures that no voice command executes without authorization and confirmation.

In at least another example, the anomaly detector as described herein adds a continuous behavioral safety layer to monitor voice commands and provide further assurance that such commands are authorized/have been authorized. In at least another example, MCP orchestration enables modular expansion (e.g., by connecting to third-party programs or applications) without increasing exposure or latency.

In at least one embodiment, Clara's latency is less than about 1 second and further competes favorably with known voice assistants (e.g., about 0.6 second latency round-trip), while avoiding dependence on remote and/or cloud servers, Internet networks, and the like.

Indeed, unlike known voice assistance such as, for instance, Alexa and Google Assistant, at least one embodiment of the invention (1) stores no cloud transcripts, (2) performs local PIN validation for actions (e.g., payment processing), and/or (3) records an immutable audit log of all actions (including, for instance, voice commands, executed actions, and the like). Further, unlike such known voice assistants, at least one embodiment of the invention (1) is privacy-first and safety-validated, (2) is 100% on-device, (3) contains further security and anomaly detection protocols beyond basic cloud authentication, (4) is vendor-neutral (e.g., does not require a closed and/or proprietary software system such as Amazon or Google, (5) can operate fully offline, and (6) has a transparent, rule-driven model with non-proprietary and/or open-source components. Accordingly, at least one embodiment uniquely combines openness, accessibility, and verifiable trust, and is therefore a demonstrably safer voice assistant/automation agent capable of deployment in healthcare settings (including, for instance, hospital settings, clinic settings, elder-care settings, etc.) where data sovereignty is mandatory. For instance, in at least one example, Clara supports, and is able to recognize, voice commands from individuals with speech impairments and/or speech conditions (e.g., dysarthria).

Table 1 below shows a general comparison between at least one embodiment of the invention and examples of known voice assistants (e.g., Google Assistant, Alexa, etc.). Specifically, the quantitative metrics shown in the table are derived from experimental evaluations of at least one embodiment of the invention, as described in the Appendix, and show how Clara compares to both Google Assistant and Alexa.

TABLE 1

Comparison of Quantitative Metrics between Clara and Known Voice Assistants

| Metric | Clara | Google Assistant | Alexa |
|---|---|---|---|
| Task Success Rate | 95% | 93% | 92% |
| Rule Hit Rate | 98% | N/A | N/A |
| Average Latency | 780 ms | 650 ms | 620 ms |
| False Activations (per hour) | 0.0 | 0.9 | 0.8 |
| Energy Use | 4.5 W | 7 W | 6 W |
| Anomaly Detection Accuracy | 93.6% | N/A | N/A |

Specifically, Task Success Rate (TSR) represents a ratio of successfully executed user commands to total issued commands during a pre-defined test interval. Rule Hit Rate (RHR) represents a ratio of correctly identified rule-relevant actions to total rule-relevant actions evaluated by the at least one embodiment of the invention. Average latency is an amount of time measured from the receipt of a voice instruction or command to the actual execution of a validated version of that instruction or command. Energy use is defined as the average power consumption of the computing device during active operation (that is, while the at least one embodiment of the invention is operating on the computing device). Anomaly detection performance is measured by evaluating detected anomalies against labeled event data obtained from home assistant logs and smart device telemetry. Thus, anomaly detection accuracy is calculated as a proportion of correctly identified anomalous events relative to total evaluated anomalous events, using known classification techniques. The values shown in Table 1 are empirical observations for the at least one embodiment over a specific testing period.

As can be seen, Clara compares favorably to known voice assistants such as Google Assistant and Alexa (e.g., in average latency). Moreover, Clara is superior to such assistants in many metrics. For instance, Task Success Rate (TSR), which is defined in the Appendix, is the percentage of commands executed correctly. In experiments, Clara has a higher success rate than either Google Assistant and Alexa, meaning that it executes voice commands at a higher rate. This was validated in over 500 test runs, as described further in the Appendix. Moreover, in experiments, Clara had zero false activations. In other words, Clara did not perform an activation or action in the absence of an intentional voice command by a user. This is important since known voice assistants such as Google and Alexa can activate based on background noise or general speech that is not a specific command, as evidenced by the false activation rates shown in the table. Finally, Clara has a lower energy use, providing a specific and quantifiable improvement in home energy efficiency.

Clara also incorporates various features not seen in known voice assistants, such as Rule Hit Rate (RHR) and anomaly detection accuracy. RHR, in at least one embodiment, is defined as a proportion of evaluated voice commands for which the security protocols (e.g., those embodied in SHIELD, as described above herein) correctly apply the predefined security rules and policies (e.g., correctly requesting voice confirmation for commands, correctly evaluating and/or processing such confirmation, etc.). In at least one embodiment, a given command is considered non-compliant with the security protocols when, upon evaluation by SHIELD, the command violates one or more defined security constraints, such as lacking required user authorization (e.g., lacking a PIN, lacking user confirmation, etc.), exceeding permitted action scope, targeting restricted devices, occurring under anomalous or unsafe contextual conditions, etc. Non-limiting examples of such anomalous or unsafe contextual conditions may include, for instance, (1) commands issued at an unusual or prohibited time (e.g., unlocking a door late at night when such actions would normally be restricted or undesirable), (2) commands inconsistent with recent user behavior or historical usage patterns (e.g., sudden financial or security-sensitive commands not previously observed, (3) conflicting environmental or device state information (e.g., attempting to disable alarms while intrusion sensors are active), (4) repeated or rapid command attempts indicative of automation abuse or replay behavior, and (5) commands originating during anomalous system conditions, such as degraded connectivity, sensor malfunction, detected compromise of a connected device, etc. In such cases, SHIELD blocks or defers execution of the command rather than executing it. Accordingly, a high RHR indicates that the security protocols (e.g., as embodied in SHIELD, as described above herein) reliably identify commands requiring restriction, confirmation, or rejection, and enforces the applicable security policies, thereby improving user safety and system trustworthiness.

As described further in the Appendix, RHR was measured over an extended evaluation period, and anomaly detection accuracy, which is the percentage of anomalous commands which were correctly identified by the system as anomalous, was validated across a large set of events. The high percentage exhibited by Clara with respect to RHR and anomaly detection show that these new features perform reliably and therefore provide a significant improvement in user security and safety over known voice assistants. For instance, and as described further in the Appendix, RHR was measured across an extended period of time (specifically, a 24-hour long stress test), and anomaly detection accuracy was validated across 20,000 event records.

The superiority of Clara can also be seen with respect to subjective measures, including user experience feedback. Test participants described Clara, in at least one embodiment, as "more polite and trustworthy" than known voice assistants. Without wishing to be bound by theory, this may result from the operation of the SHIELD module as described above herein, including the validation agent's use of explicit confirmation prompts and multi-step dialog handling. For example, when a command requires validation, Clara may generate spoken confirmation messages that explain the pending action (e.g., indicating that the system is verifying or double-checking the command prior to execution), thereby increasing user transparency and trust. As an example, according to users, Clara also vocalized transparent confirmations and human-like phrasing (e.g., "Okay, I'll double-check before turning that off"), which increased user comfort with Clara. Additionally, in at least one embodiment, Clara may employ verbosity tuning, where the content, length, or frequency of spoken feedback is adjusted based on factors such as, for instance, command risk level (that is, the determined risk of the user command), user preferences, or system context. This allows Clara to provide sufficient feedback for safety-critical actions (e.g., ones requiring a PIN) while avoiding excessive or repetitive responses for routine interactions (e.g., turning on a light). Such verbosity tuning therefore provides feedback without overwhelming users.

Accordingly, Clara is a privacy-preserving, on-device assistant that reduces the risk of digital surveillance. Clara also provides autonomy (by executing actions via voice commands) without sacrificing dignity, which is especially valuable for certain users, such as elderly individuals, speech-impaired users, and the like. Moreover, in at least one example, Clara is completely open-source, meaning that it fosters reproducible research and equitable access to its underlying technologies.

One or more of the embodiments and/or examples described herein can be implemented on one or more computing systems, as described in further detail below.

At least one embodiment comprises a multi-zone, multi-agent, on-device voice assistant computer architecture that (1) enforces secure command validation, (2) uses local processing to preserve privacy, (3) detects anomalies, (4) performs tool-mediated action orchestration (e.g., using hierarchical AI agents), and/or (5) performs self-hosted (that is, on-device) LLM reasoning, one or more of which ensures user privacy, safety, and/or transparency.

The aforementioned multi-zone architecture may, in at least one example, comprise multiple (e.g., five) different zones defined by segmented trust boundaries. The zones may include, for example, zones associated with audio capture, speech processing, validation, reasoning, external tool invocation, and device actuation. Communication between zones is governed by security policies and layered safety constraints, and data exchanged between zones may be protected using encrypted transport. In at least one embodiment, the zones need not form a strictly linear or sequential pipeline, and data may traverse directly between various zones when permitted by the security policies/rules. In this manner, the multi-zone architecture provides flexible, policy-controlled isolation while enabling secure data exchange across different functional components.

Figure 7:
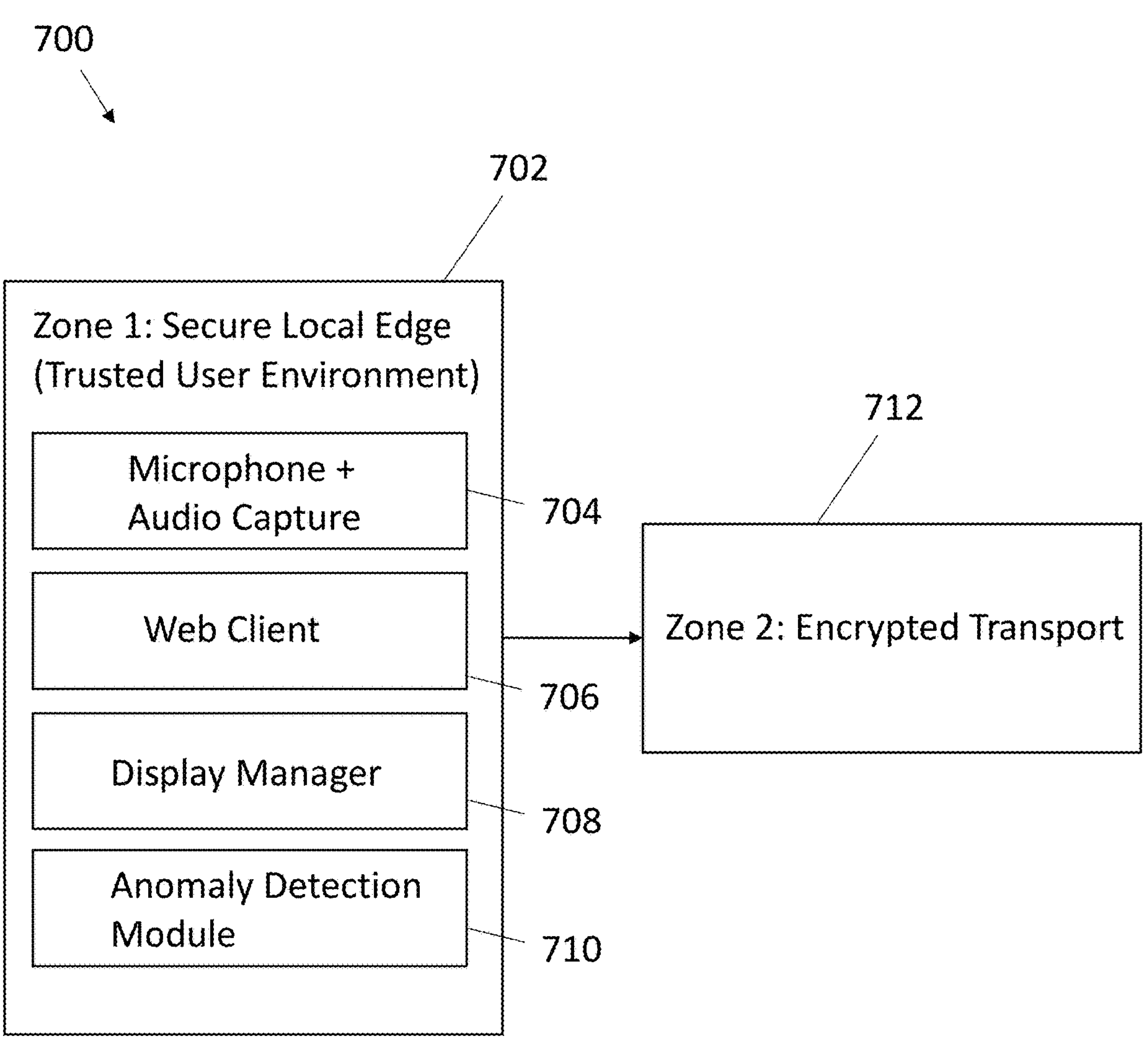
FIG. 7 is a block diagram showing the system architecture of at least one embodiment of the invention.
Figure 7:
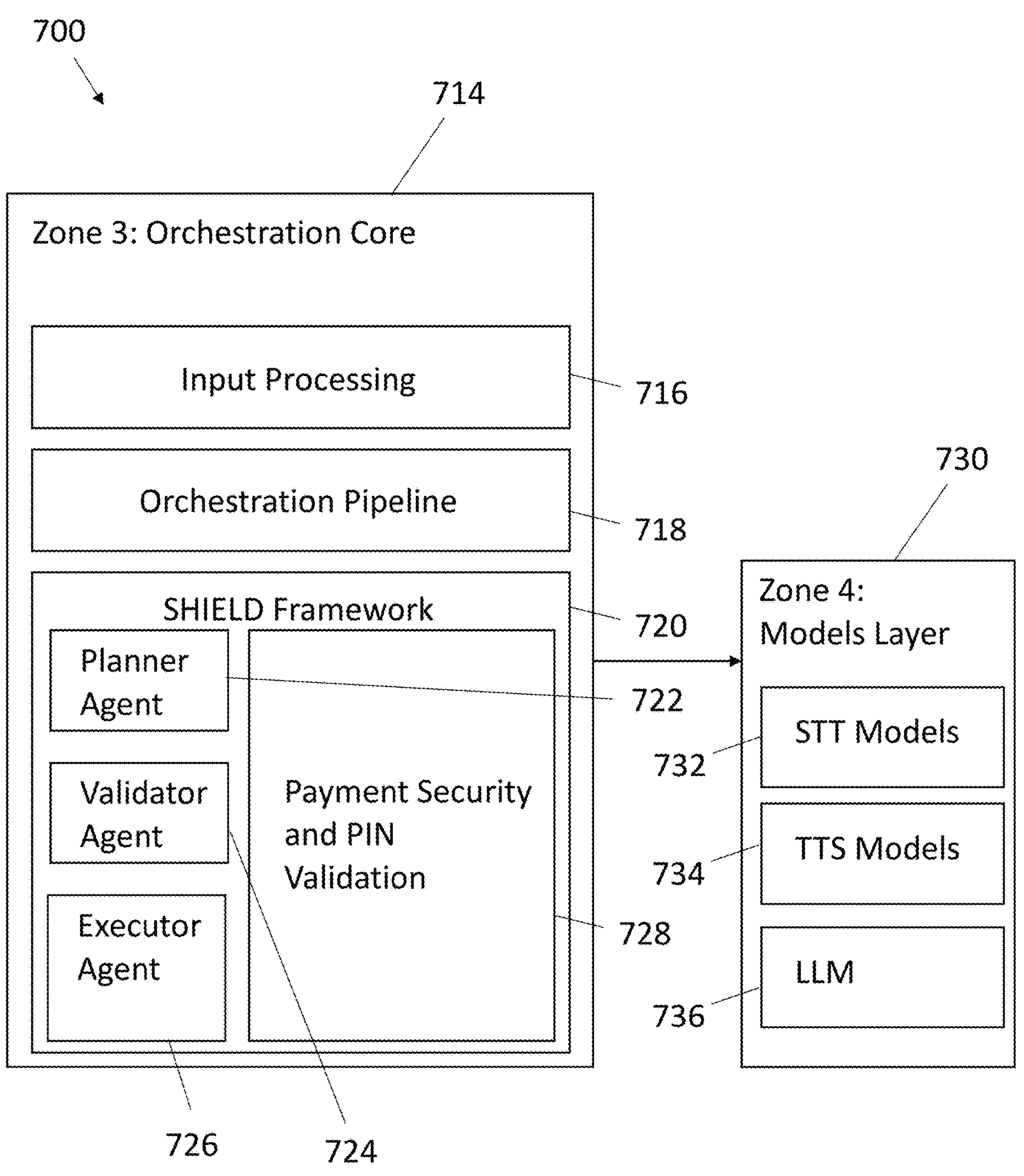
Figure 7:
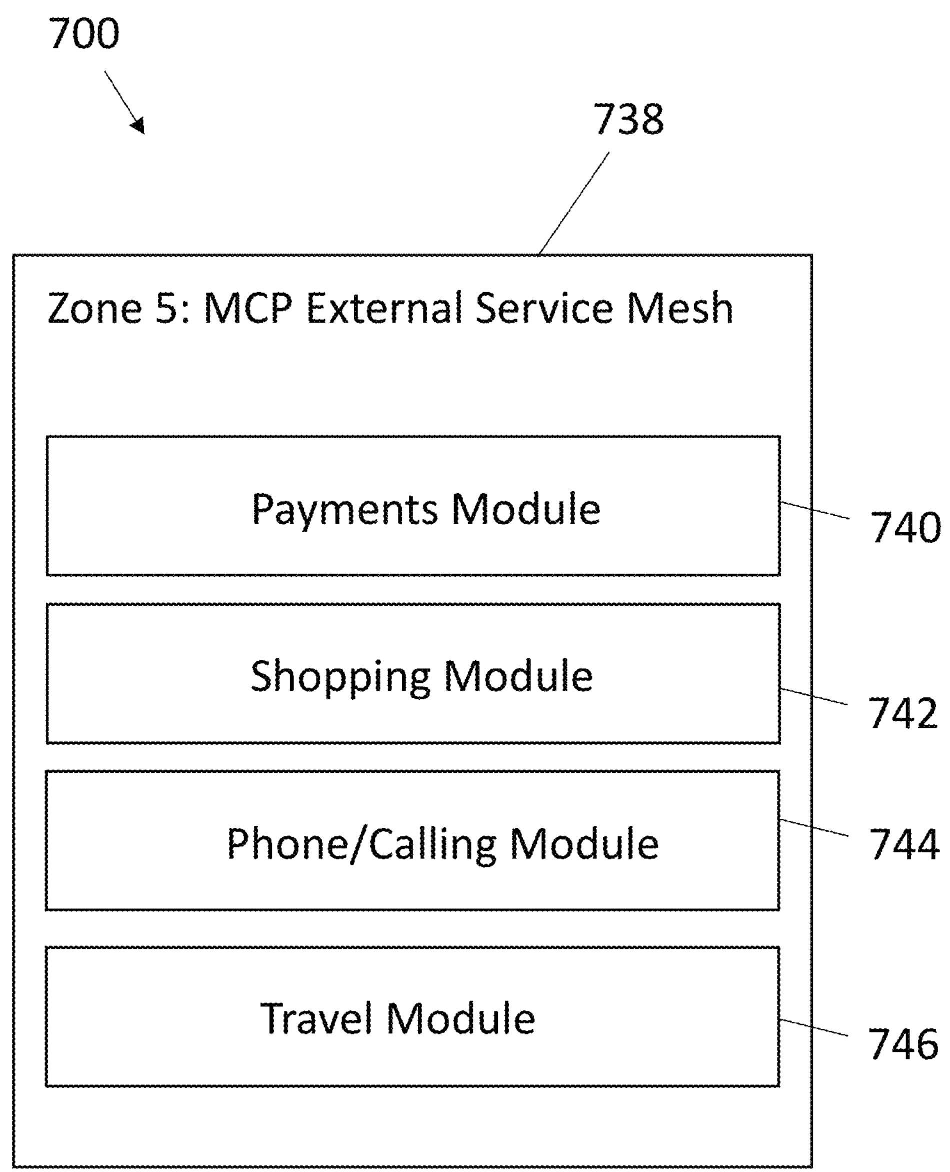

Turning now to FIG. 7, a block diagram 700 shows a five-zone architecture according to at least one embodiment. Each of these five federated zones are configured to enforce strict control over data flow, command execution, and/or AI-driven reasoning. Specifically, the zones are (1) a secure local edge 702 (labeled as Zone 1), (2) an encrypted transport 712 (labeled as Zone 2), (3) an orchestration core 714 (labeled as Zone 3), (4) a models zone or layer 730 (labeled as Zone 4), and (5) an MCP external services zone 738 (labeled as Zone 5). Each of these zones will now be described in detail; however, as described above herein, data does not necessarily always proceed through encrypted transport (Zone 2) when moving between one or more other zones. Zone-to-zone communication can be (1) sequential, (2) conditional, (3) bidirectional, or (4) selectively bypassed, depending on the data type, operation/command being evaluated, the security rules that govern such operation/command, etc.

The secure local edge 702 contains microphone and audio capture subsystem 704, web client 706, display manager 708, and anomaly detection module 710. The microphone and audio capture 704 captures raw audio while retaining all computation at the edge until a valid wake-word or Voice Activity Detection (VAD) trigger is received. The web client 706 (which may, in at least one example, be implemented as a headless WebRTC client) transmits encrypted audio frames (e.g., Opus audio frames) to Zone 3 using one or more known secure transport protocols (e.g., Datagram Transport Layer Security (DTLS) and/or Secure Real-time Transport Protocol (SRTP)). The display manager 708 (which may, in at least one example, be an organic light-emitting diode (OLED) display manager) provides state visualization (e.g., sleeping, listening, thinking, talking states) controlled by orchestration frames. In at least one embodiment, the secure local edge 702 further supports local execution of validated commands, for example by interfacing with local Internet of Things (IoT) devices or General Purpose Input/Output (GPIO) hardware (not shown). Such local execution may be performed by one or more components of the secure local edge without requiring transmission of the command outside the local zone. Finally, anomaly detection module 710 implements one or more anomaly detection techniques (e.g., a hybrid Isolation Forest plus LSTM autoencoder) for detecting irregular behaviors in home automation logs. Such anomaly detection module may be similar to, or the same as, any anomaly detection module described above herein. When anomalies are detected, a security interrupt may be triggered, and transport may be modified based on applicable security policies/rules (e.g., transport may be forcibly triggered/routed via Zone 2).

Zone 2 (that is, encrypted transport 712) is responsible for the secure, low-latency passing of messages between Zone 1 and Zone 3. Encrypted transport 712, in at least one example, uses Daily WebRTC with DTLS encryption, carries audio upstream (to Zone 1) and validated command frames downstream (to Zone 3), and supports interrupt-driven escalations for anomalies or high-risk states (e.g., anomalies detected by module 710).

Zone 3 (that is, orchestration core 714) may, in at least one example, be powered partially or wholly by one or more AI programs and/or algorithms. Orchestration core 714 is a central processing and decision-governance hub, comprising (1) an input processing layer 716, (2) an orchestration pipeline 718, and (3) SHIELD framework 720.

Input processing layer 716 performs VAD through one or more known methods and/or programs (e.g., Silero), and then segments the audio and produces speech frames.

Orchestration pipeline 718 may, in at least one example, be a frame-based orchestration pipeline (e.g., Pipecat pipeline). In this pipeline, all communication and control signals (e.g., audio, STT output, validation requests, tool calls, etc.) are encoded as typed frames. This ensures deterministic behavior, debuggable processing, and service isolation.

SHIELD framework 720 may be similar to, or the same as, any other example or embodiment of SHIELD described above herein. Specifically, framework 720 comprises planner agent 722, validator agent 724, executor agent 726, and payment security and PIN validation 728. Planner agent 722 performs structured intent extraction (e.g., to obtain user intent), applies formal rules from, e.g., rules.txt and ha.json files, and annotates planned actions with rule violation flags and/or indicators. Validator agent 724 requests explicit user confirmation (e.g., using text-to-speech (TTS)) for flagged commands, mutes microphone until a confirmation response is received, and produces one or more validated plan frames. Executor agent 726 executes validated commands using one or more device or application interfaces (e.g., via WebRTC or local device Application Programming Interfaces (APIs)). Additionally, executor agent 726 may perform command-level anomaly checks immediately prior to execution, such as validating command parameters, execution context, or device state, to prevent unsafe or inconsistent actuation. Such command-level anomaly checks are different from the upstream anomaly detection performed at the secure local edge (e.g., by anomaly detection module 710), which focuses more on edge-level behavioral anomalies (e.g., device telemetry, automation logs, usage patterns, etc.). After performing such checks, executor agent 726 may produce a secure command frame routed to Zone 1.

Payment security and PIN validation 728 specifically intercepts financial or payment actions, requests user authentication, such as, for example, a PIN (e.g., via PIN entry, TTS, etc.), and validates the authentication (e.g., validates the PIN) before permitting execution of the command (e.g., before forwarding plan frames to any tools/other applications). In at least one embodiment, the SHIELD framework 720 further includes a context aggregation component or context aggregator, which maintains conversational state and long-term memory, injects relevant context (including, for instance, the long-term memory) into one or more LLMs as LLM input(s), and summarizes interaction or conversation history for storage (e.g., as a memory.txt file) on the local edge. Such a context aggregation component or context aggregator may be implemented as one or more logical subcomponents within the SHIELD framework 720 and therefore is not shown separately in FIG. 7. For instance, the context aggregation component or context aggregator may be implemented within the same orchestration environment as planner agent 722, validator agent 724, and/or executor agent 726.

Zone 4 (that is, models zone or layer 730) provides inference services to Zone 3 via one or more APIs and comprises, in at least one embodiment, STT models 732 (e.g., Deepgram STT), TTS models 734 (e.g., Cartesia TTS), LLM 736 (e.g., self-hosted GPT-OSS-20B), and optionally GPT-4o. The LLM 736 may, in at least one example, run on a GH200 GPU node, offering (1) about 300 tokens per second, (2) fast Time to First Token (TTFT) via reasoning_effort=low, and (3) private, auditable local reasoning. The models in Zone 4 may perform inference operations in response to requests from Zone 3 and therefore do not independently control dialog flow or command execution. In particular, the LLM 736 and TTS models 734 may be invoked by the SHIELD framework 720 to generate clarification text or synthesized speech when the planner agent 722 or validator agent 724 determines that additional user input is required. In this manner, dialogue control (that is, control of dialogue/exchanges with the user) remains within Zone 3, while Zone 4 supplies model-based inferences used to support clarification, confirmation, or explanation of interactions with the user.

Zone 5 (that is, MCP external services zone 738) implements structured tool calling (e.g., to third-party programs or applications) using MCP. Non-limiting examples of such third-party applications include (1) a payments module 740 (e.g., Stripe), (2) a shopping module 742 (e.g., Instacart), (3) a phone/calling module 744, and (4) a travel and/or travel search module 746 (e.g., Amadeus). Other third-party applications for other services (e.g., scheduling appointments, calendars, online ordering capabilities, etc.) are known in the art. Tool calls are intercepted and validated by the SHIELD payment gate (that is, payment security 728) as appropriate before execution.

Further details regarding the five-zone architecture are set forth in the Appendix (Architecture Diagram). Non-limiting examples of voice commands/requests and interactions between Clara and/or VoiceShield and the user are also set forth in the Appendix.

Figure 10:
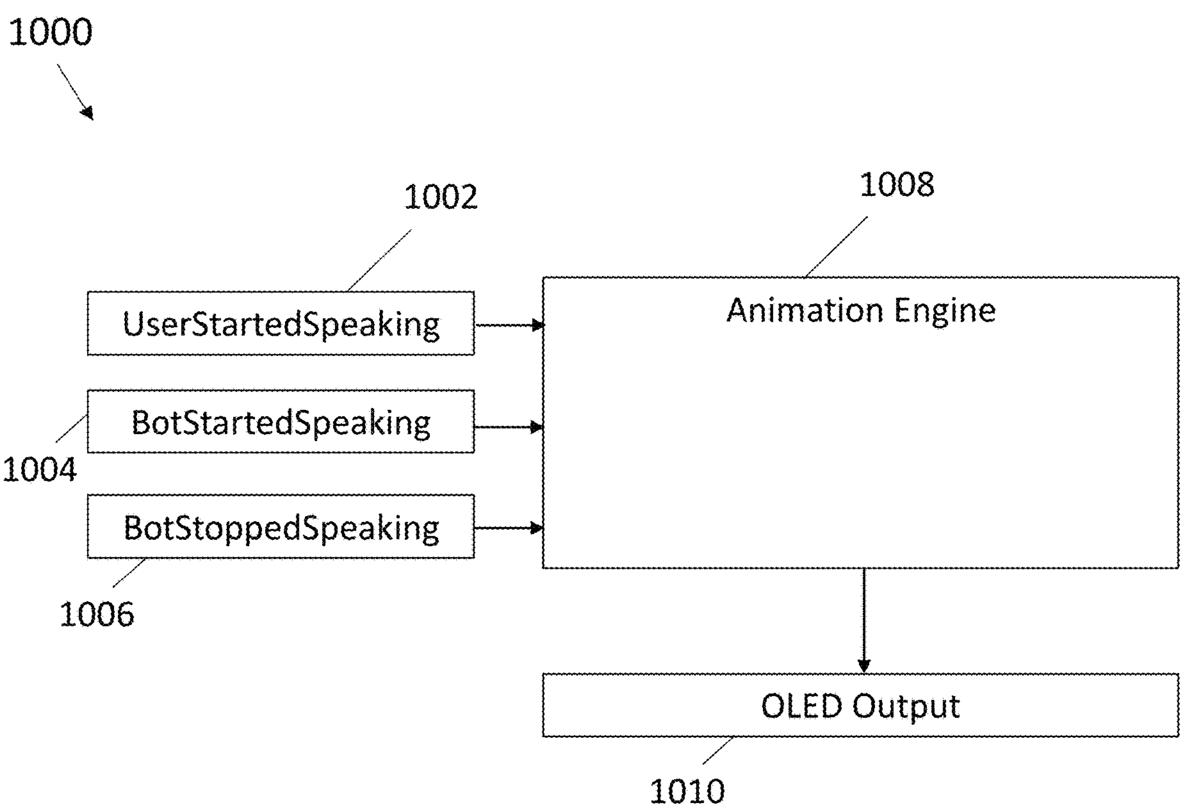
FIG. 10 is a flow chart of an expressive hardware animation state engine integrated into orchestration frames, according to at least one embodiment of the invention.

FIGS. 8-11 each illustrate and describe a specific individual workflow orchestrated by the SHIELD framework. Specifically, FIG. 8 shows a payment security process, FIG. 9 shows an anomaly detection process, FIG. 10 shows a user interface (UI)/animation state handling process, and FIG. 11 shows a conversational memory summarization and context injection process.

Turning now to FIG. 8, a flow chart 800 shows a payment security process controlled by the SHIELD framework (e.g., any SHIELD framework described herein, including, for instance, framework 720). User speech 802 is first processed by planner agent 722 (or any other planning and/or planner agent described herein) to identify intent and determine whether the user command corresponds to a financial or payment-related action. Upon detection of a financial or payment-related command, payment security and validation component 728 is invoked or triggered to request and validate user authentication credentials, such as a PIN. No payment-related action proceeds or is permitted to proceed until successful authentication has occurred. After authentication, the validated payment request may be provided to LLM 736, which performs various functions, including, for instance, generating structured transaction details, producing confirmation prompts, formatting payment instructions, and the like. The LLM 736 does not independently authorize payment. Rather, the payment module 740 processes the payment by executing the transaction using the authenticated and validated payment instruction.

FIG. 9 is a flow chart 900 of an anomaly detection process between the edge device and orchestration core. Specifically, home assistant logs 902 are examined and/or analyzed by the anomaly detection module (e.g., detection module 710 or any other anomaly detection described above herein), which may be an isolation forest 904 and an LSTM autoencoder 906. When an anomaly or anomalous behavior is detected, anomaly flag 908 is generated and an interrupt (e.g., WebRTC interrupt) 910 may be issued to suspend or block further command execution. Following the interrupt, the SHIELD framework may take one or more actions based on applicable security policies/security rules and context, including, for instance, routing the command for additional user confirmation, requesting additional authentication (e.g., a PIN), modifying or blocking the command, or aborting execution entirely. Accordingly, the anomaly detection process, and in particular the interrupt 910, operates as a dynamic safety gate or safety checkpoint that prevents unsafe or unexpected actions from being executed without appropriate verification.

FIG. 10 is a flow chart 1000 of a visual feedback workflow in which conversational state events, such as user speech initiation or system speech output, are provided to an animation engine 1008. In at least one embodiment, the animation engine 1008 (e.g., an expressive hardware animation state engine) is integrated with an orchestration component of the system. Such an orchestration component, examples of which are known, coordinates system behavior across conversational, audio, and execution modules and emits structured event messages (referred to herein as "orchestration frames") representing state transitions. In at least one embodiment, orchestration frames may indicate events such as, for instance, when a user starts speaking ("UserStartedSpeaking" 1002), when the system begins generating audio output/an audio response (e.g., in response to a user speaking or issuing a command) ("BotStartedSpeaking" 1004, and when the system completes audio output ("BotStoppedSpeaking" 1006). Such event-based state signaling may be implemented using known event-driven or finite-state-machine techniques. The orchestration frames are provided or fed into animation engine 1008, which controls a display output (e.g., OLED output) 1010 to visually reflect system states such as listening, speaking, idle, etc. Specifically, the animation engine 1008, examples of which are known, may map the received state information to corresponding visual behaviors and produce a visual output (such as the display output 1010) to reflect the current system states to the user. For instance, in at least one embodiment, the animation engine may implement known visual behaviors that are mapped to conversational state events. Non-limiting examples include (1) when a "UserStartedSpeaking" event is received, the animation engine may display a listening animation, such as, e.g., a pulsing ring, waveform, illuminated indicator, etc., (2) when a "BotStartedSpeaking" event is received, the animation engine may display a speaking animation, such as, e.g., animated bars, rotating patterns, a color change indicating output, etc., and (3) when a "BotStoppedSpeaking" event is received, the animation engine may transition the display to an idle or resting state. Such visual behaviors may be implemented using known user interface (UI) animations or state-machine techniques and rendered on a display device, such as an OLED panel/output 1010.

FIG. 11 illustrates a memory system architecture 1100, and specifically a conversational memory workflow, of at least one embodiment of the invention. The illustrated workflow supports conversational continuity while maintaining bounded memory usage and preserving user privacy. Conversation input 1102 is provided or fed into a summarizer 1104, which summarizes the input 1102 by, for instance, reducing the conversation history therein into a condensed representation, which is stored in a local memory file (e.g., a memory.txt file) 1106. The summarizer 1104 may be implemented, in various embodiments, as a language model, a rule-based summarization process, or a hybrid approach (that is, some combination of a language model/LLM and a rule-based summarization process). In at least one embodiment, the summarizer 1104 does not store or retain raw conversational material or conversational transcripts. The memory file 1106 is then provided or fed into a context aggregator 1108, which selectively incorporates or injects relevant summarized context from the memory file 1106 into subsequent LLM prompts or orchestration decisions, thereby enabling continuity across multiple interactions with the user while maintaining various limits (e.g., limiting the amount of memory or computing resources used, limiting long-term data retention to preserve user privacy, reducing exposure of sensitive information, etc.).

Figure 12:
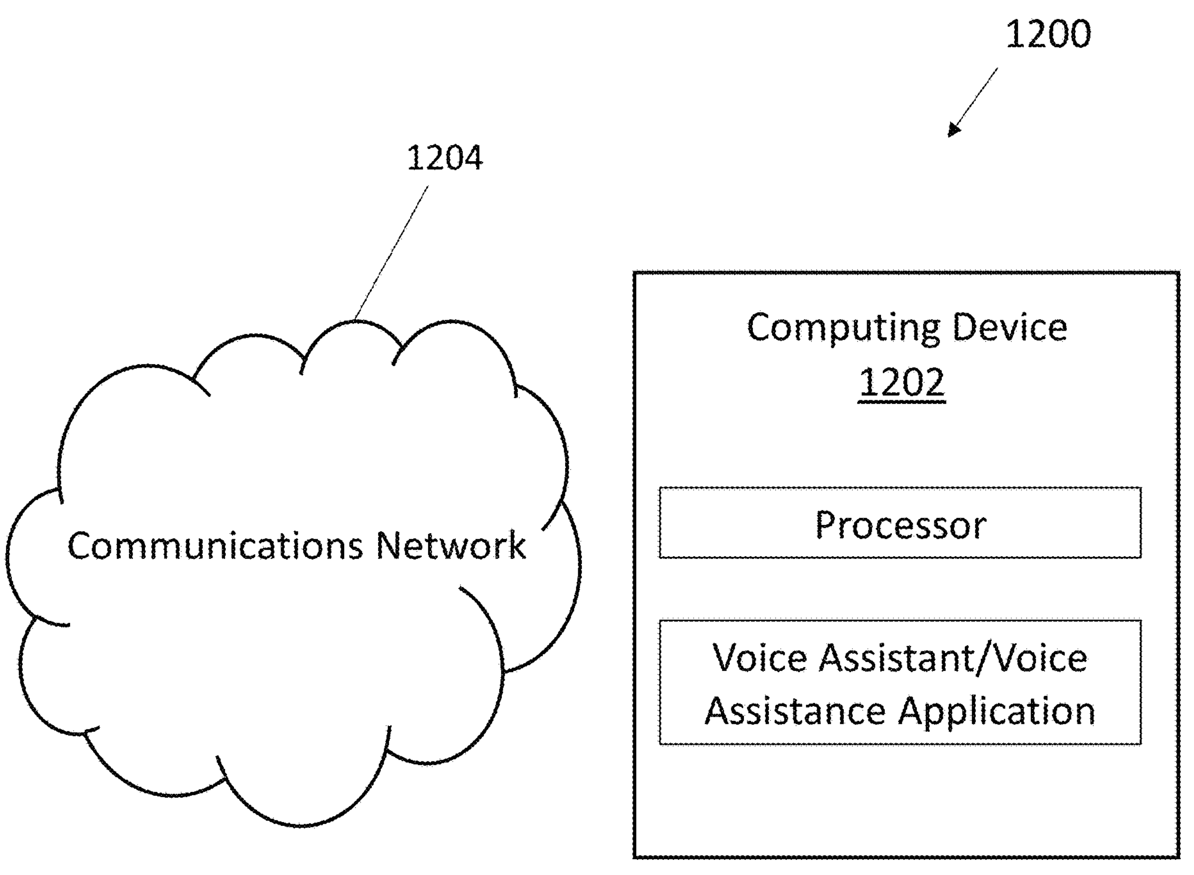
FIG. 12 is a block diagram of a computing system for providing voice assistance to a user, according to at least one embodiment of the invention.

FIG. 12 is a block diagram of a computing system 1200 for providing voice assistance to a user, according to an example embodiment. Thus, the computing system 1200 may perform, for instance, any of the steps, functions, calculations, data transmissions, etc. described above herein.

The system 1200 comprises one or more computing devices 1202 that may execute one or more voice assistant and/or voice assistance applications, which recognize voice commands and execute such commands to perform one or more tasks (e.g., operating one or more home appliances or other devices), as described above herein. Additionally, the applications can be used to send information to, or receive information from, the user issuing the command and/or other users (e.g., other individuals near the user or living in the same residence). The applications can further be capable of scheduled or triggered communications or commands when various events occur (e.g., when the user wants to issue a command, to obtain verification of a previously-issued command, when an action to execute the command has been completed, etc.).

The one or more computing devices 1202 can be used to store acquired computational data, as well as other data in memory and/or a database. The memory may be communicatively coupled to one or more hardware processing devices.

The one or more computing devices 1202 may further be connected to a communications network 1204, which can be the Internet, an intranet, or another wired or wireless communication network. For example, the communication network 1204 may include a Mobile Communications (GSM) network, a code division multiple access (CDMA) network, 3$^{rd}$ Generation Partnership Project (GPP) network, an Internet Protocol (IP) network, a wireless application protocol (WAP) network, a Wi-Fi network, a satellite communications network, or an IEEE 802.11 standards network, as well as various communications thereof. Other conventional and/or later developed wired and wireless networks may also be used.

The one or more computing devices 1202 include at least one processor to process data and memory to store data. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions related to the voice assistant and/or voice assistance application. In addition, the one or more computing devices 1202 further include at least one communications interface to transmit and receive communications, messages, and/or signals.

Thus, information processed by the one or more computing devices 1202, or the applications executed thereon, may be sent to another computing device, such as a remote computing device, via the communication network 1204.

Figure 13:
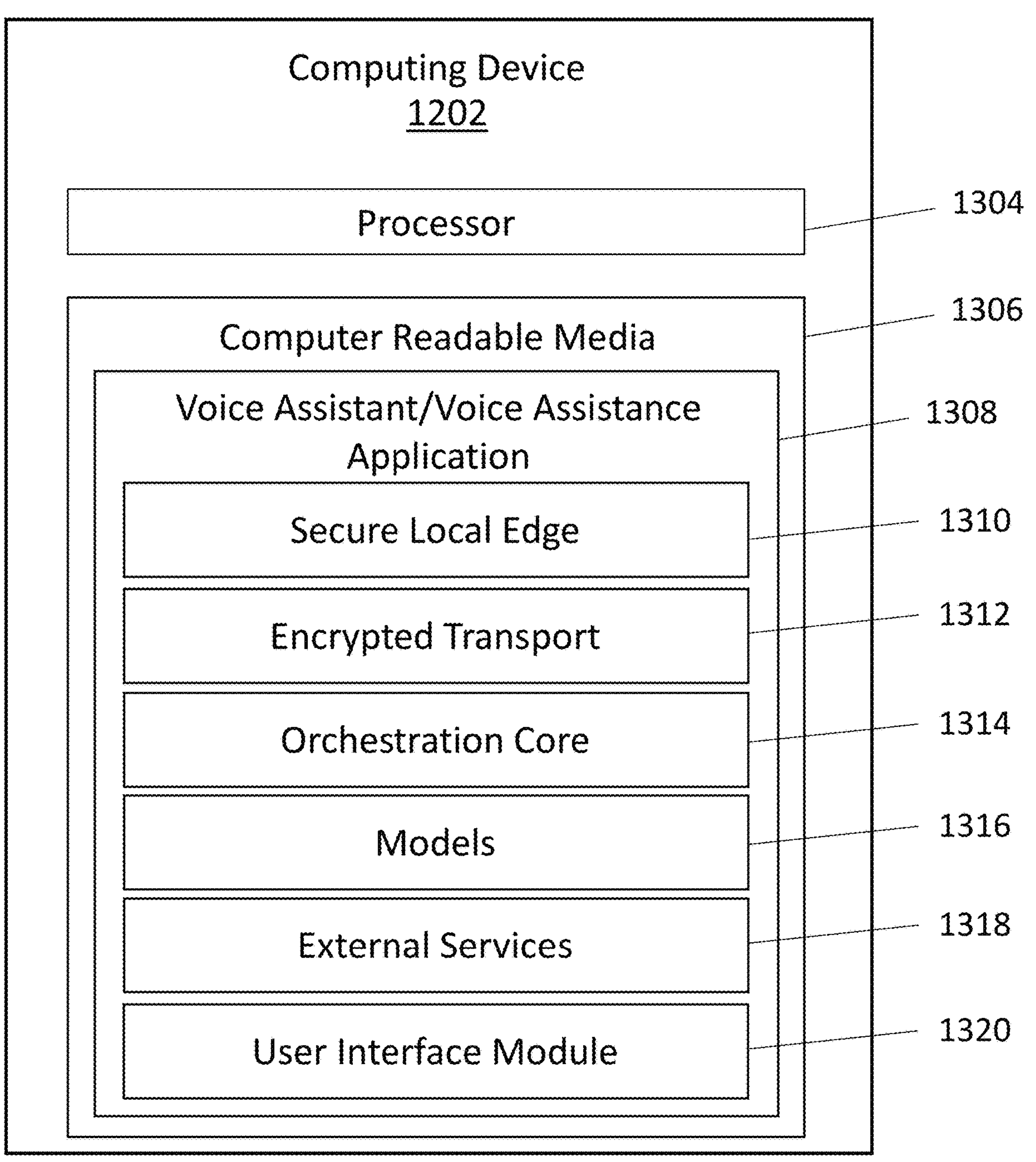
FIG. 13 is a block diagram of a computing device, according to at least one embodiment of the invention.

FIG. 13 illustrates a block diagram of a computing device 1202 according to an example embodiment. The computing device 1202 includes computer readable media (CRM) 1306 in memory on which a voice assistant and/or voice assistance application 1308 or other user interface or application is stored. The computer readable media may include volatile media, nonvolatile media, removable media, non-removable media, and/or another available medium that can be accessed by the processor 1304. By way of example and not limitation, the computer readable media comprises computer storage media and communication media. Computer storage media includes non-transitory storage memory, volatile media, nonvolatile media, removable media, and/or non-removable media implemented in a method or technology for storage of information, such as computer/machine-readable/executable instructions, data structures, program modules, or other data. Communication media may embody computer/machine-readable/executable instructions, data structures, program modules, or other data and include an information delivery media or system, both of which are hardware.

The voice assistant and/or voice assistance application 1308 can include any one or more of the modules, platforms, zones, and the like described herein, such as, for instance, a secure local edge module/platform 1310, an encrypted transport module/platform 1312, an orchestration core module/platform 1314, a models layer/platform 1316, and an external services module/platform 1318 (e.g., one or more of which are similar to, or the same as, the portions/aspects described in FIG. 7). Additionally, user interface module 1320 displays a user interface regarding one or more voice assistance functions (e.g., showing one or more voice commands currently being processed, one or more voice commands that have already been executed, etc.). One or more of the aforementioned modules, layers, and/or platforms may also be operable to obtain data from other sources, such as a user, a database, and the like, and to process that data.

Using a local high-speed network, the computing device 1202 may receive the aforementioned data (e.g., one or more voice commands) in near real time, process the data, validate the data (e.g., validate the voice commands), and perform one or more actions to execute the one or more voice commands and/or validated voice commands. Such functions may be executed by one or more of the modules, layers, and/or platforms within the voice assistant and/or voice assistance application 1308 or other stored applications.

Measured or calculated data may be monitored to generate an event and an alert if something is out of range (e.g., if there is an error with one or more voice commands, if the command has not been validated appropriately, if there is an issue with performing the action requested by the voice command, etc.). Alternatively or additionally, an alert may also be sent after one or more voice commands have been executed or performed. Such alerts may be sent in real-time or near real-time using an existing uplink or dedicated link. The alerts may be sent using email, SMS, push notification, or using an online messaging platform to end users and computing devices, among others.

The voice assistant and/or voice assistance application 1308 may provide data visualization using a user interface module 1320 for displaying a user interface on a display device. As an example, the user interface module 1320 generates a native and/or web-based graphical user interface (GUI) that accepts input and provides output viewed by users of the computing device 1202. The computing device 1202 may provide real-time automatically and dynamically refreshed information on voice commands, recognition thereof, validation thereof, and the like. The user interface module 1320 may send data to other modules, layers, and/or platforms of the voice assistant and/or voice assistance application 1308 of the computing device 1202, and retrieve data from other modules, layers, and/or platforms of the voice assistant and/or voice assistance application of the computing device 1202 asynchronously without interfering with the display and behavior of the user interface displayed by the computing device 1202.

Figure 14:
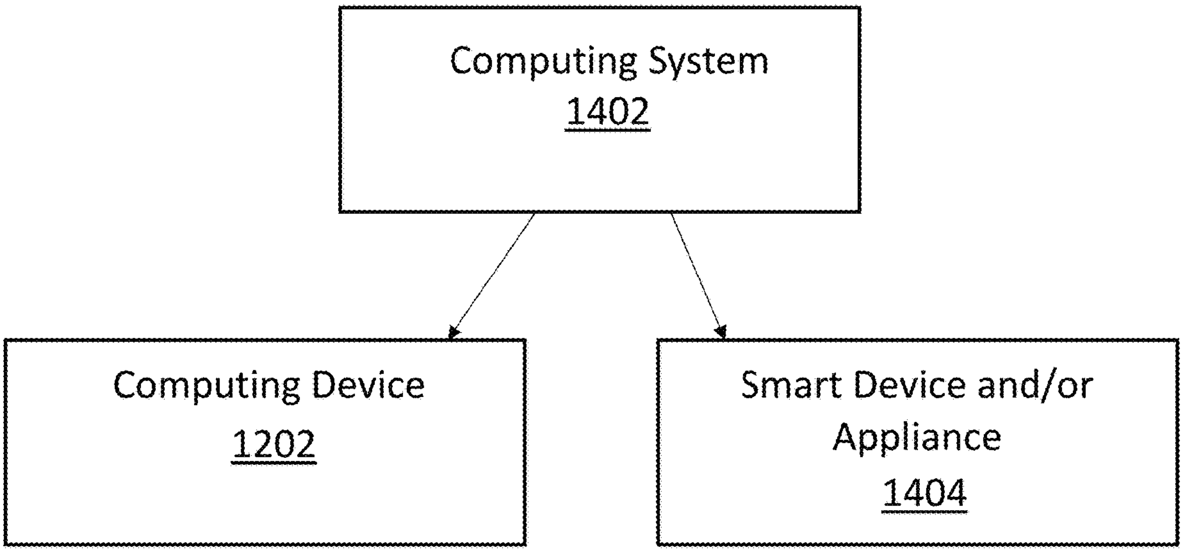
FIG. 14 shows an example of a system for implementing certain aspects of the present technology, according to at least one embodiment of the invention.

Further, one or more computing systems can implement one or more aspects of the technology and/or systems described herein. FIG. 14 shows an example of such a computing system 1402, which may include one or more computing devices (e.g., computing device 1202) and/or processing units, which include one or more processors and software. The one or more computing devices (e.g., computing device 1202) may execute one or more applications, such as, for example, the voice assistant and/or voice assistance application 1308 described above herein, or one or more portions thereof. The computing system 1402 may further control, monitor, and/or extract data from, for instance, a smart device and/or appliance 1404 (e.g., IoT devices, smart lights, smart appliances, doors, home assistants, and the like). The computing system can further comprise a graphical user interface (GUI) so that a user may control the system or portions thereof, such as, for instance, the smart device and/or appliance 1404.

Figure 15:
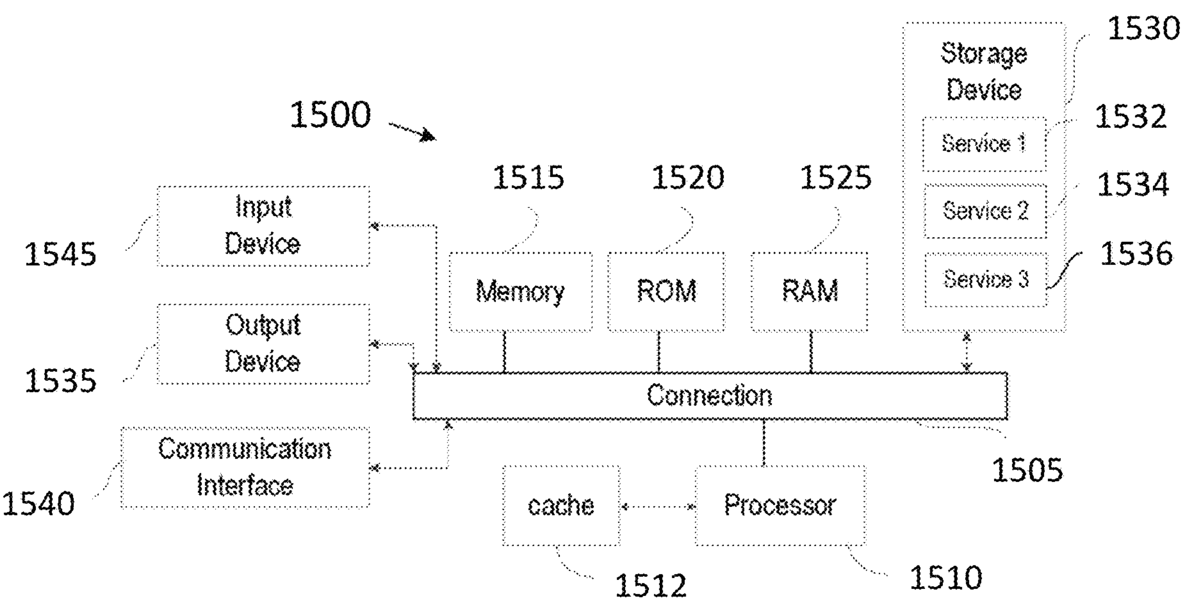
FIG. 15 shows a further example of a system for implementing certain aspects of the present technology, according to at least one embodiment of the invention.

FIG. 15 shows an example of computing system 1500, which can be for example any computing device such as the computing device 1202, or any component thereof in which the components of the system are in communication with each other using connection 1505. Connection 1505 can be a physical connection via a bus, or a direct connection into processor 1510, such as in a chipset architecture. Connection 1505 can also be a virtual connection, networked connection, or logical connection.

In some embodiments, computing system 1500 is a distributed system in which the functions described in this disclosure can be distributed within a datacenter, multiple data centers, a peer network, etc. Although many aspects of some embodiments disclosed are designed for use locally without the need to send most data to the cloud, they may nevertheless in some embodiments be performed in a distributed fashion either with local devices, or in the cloud or otherwise over a remote network. In some embodiments, one or more of the described system components represents many such components each performing some or all of the function for which the component is described. In some embodiments, the components can be physical or virtual devices.

Example system 1500 includes at least one processing unit (CPU or processor) 1510 and connection 1505 that couples various system components including system memory 1515, such as read-only memory (ROM) 1520 and random access memory (RAM) 1525 to processor 1510. Computing system 1500 can include a cache of high-speed memory 1512 connected directly with, in close proximity to, or integrated as part of processor 1510.

Processor 1510 can include any general purpose processor and a hardware service or software service, such as services 1532, 1534, and 1536 stored in storage device 1530, configured to control processor 1510 as well as a special-purpose processor where software instructions are incorporated into the actual processor design. Processor 1510 may essentially be a completely self-contained computing system, containing multiple cores or processors, a bus, memory controller, cache, etc. A multi-core processor may be symmetric or asymmetric.

To enable user interaction, computing system 1500 includes an input device 1545, which can represent any number of input mechanisms, such as a microphone for speech, a touch-sensitive screen for gesture or graphical input, keyboard, mouse, motion input, speech, etc. Computing system 1500 can also include output device 1535, which can be one or more of a number of output mechanisms known to those of skill in the art. In some instances, multimodal systems can enable a user to provide multiple types of input/output to communicate with computing system 1500. Computing system 1500 can include communications interface 1540, which can generally govern and manage the user input and system output. There is no restriction on operating on any particular hardware arrangement, and therefore the basic features here may easily be substituted for improved hardware or firmware arrangements as they are developed.

Storage device 1530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 1530 can include software services, servers, services, etc., that when the code that defines such software is executed by the processor 1510, it causes the system to perform a function. In some embodiments, a hardware service that performs a particular function can include the software component stored in a computer-readable medium in connection with the necessary hardware components, such as processor 1510, connection 1505, output device 1535, etc., to carry out the function.

For clarity of explanation, in some instances, the present technology may be presented as including individual functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the disclosures herein (e.g., voice assistant and/or voice assistance methods and/or functions) can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, Universal Serial Bus (USB) devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Embodiments of the present disclosure will be further understood by reference to the following non-limiting examples.

EXAMPLES

The below examples set forth voice assistant systems, models, and scenarios, each according to at least one embodiment of the invention.

Further, at least one of the examples below include data collection and/or analysis based on, for instance, one or more of the metrics listed in Table 1 above herein.

At least one of the examples below were run using (1) the Pi OS Lite operating system, (2) a home assistant in Docker, (3) MicroWakeWord (tflite) as the wake word engine (which, in at least one example, reduced overall latency to under about 100 ms with a CPU usage of about 8%), and running a home assistant in Docker.

Example 1: SHIELD Security Pipeline Integration

Method

Experiments were conducted to integrate the SHIELD framework (e.g., any one or more implementations or embodiments of SHIELD as described herein) in the Pipecat cloud framework and workflow.

Results

Results are shown in the below table.

TABLE 2

Integration of SHIELD and the agents comprised therein

| Agent | Task | Challenge | Solution |
|---|---|---|---|
| Planner | Detect intent and emit tool call | Avoid LLM hallucination | Lock function list and force JSON mode |
| Validator | Wait for "Yes/No" confirmation | Avoid background speech leakage | Mute microphone until confirmation |
| Executor | Send validated message to OS/Raspberry Pi | Avoid transport object type mismatch | Create frame and queue with Task.queue_frame( ) |

Example 2: Observability and Telemetry

Method

Experiments were conducted to improve observability and telemetry.

Results

In at least this example, Langfuse was integrated via Docker-compose, Sentry was removed for resource efficiency, and trace data was used to compute latency distribution and pipeline bottlenecks. These solutions resulted in an average end-to-end latency of about 780 ms.

Example 3: Wakeword Detection

Method

Wakeword detection was improved by (1) using piper-tts to generate around 40,000 samples of the text to speech of one or more wakewords, (2) using augmentation techniques to prevent overfitting (for positive samples), (3) using negative datasets to generate negative samples, (4) using augmentation to add background noises, varying speech volume, and/or Impulse based augmentation, and/or (5) setting about 20,000 steps to train, with the model being saved based on lower validation loss.

Example 4: MCP Service and Integration

Method

Experiments were conducted to (1) integrate local MCP servers for, e.g., Stripe, Instacart, and Amadeus using FastMCP, (2) resolve token authentication via environment variables, and (3) implement asynchronous batch reads to avoid rate limits (e.g., about 3 requests per second).

Results

Results are shown in the below table.

TABLE 2

Non-limiting examples of services and integration method(s) for each service

| Service | Purpose | Integration Method | Notes |
|---|---|---|---|
| Stripe | Can handle secure payment validation and transaction processing | FastMCP HTTP API with local PIN validation via a validator agent | Can be used for voice-initiated payments requiring verbal confirmation |
| Instacart | Can provide grocery search and order placement | MCP server endpoint delivering structured JSON responses | Can demonstrate multi-agent orchestration for external service calls |
| Twilio | Can support SMS/voice notifications and two-factor authentications | MCP interface over HTTPS with secure token authentication | Can be used for alerting and confirmation messaging |
| Amadeus | Can retrieve flight and travel booking information | FastMCP integration via RESTful schema | Can validate secure API orchestration |

The aforementioned MCP services and integration methods produced various challenges, for which solutions were implemented, as shown in Table 3 below.

TABLE 3

Challenges and solutions to MCP services and integration

| Challenge | Solution |
|---|---|
| Avoid lag for MCP servers for voice | Custom local MCP severs were built (e.g., using FastMCP For responsiveness) |
| Avoid tool registration issues with the LLM | Implemented robust re-registration logic and error handling |
| Avoid service-specific authentication issues | Used environment variables and headers to securely pass API keys |
| Reduce development overhead and mock data issues | Fully integrated the servers |
| Improve user experience issues (e.g., perceived latency) | Lack of response from the MCP sometimes made users believe that the system had "hanged"; Clara was modified via prompt optimization to make it more "verbose" and explain what it was doing (e.g., "First, I need to connect to Stripe.") |
| Avoid planner interference issues | The Home Assistant planner was sometimes incorrectly applying home assistant (HA) rules to MCP calls (e.g., payments). A solution was to tell the planner, via prompt optimization, not to apply HA rules to non-HA requests |

Implementing the above solutions resulted in an operational full tool-augmented conversational pipeline.

Example 5: Prompt Optimization for the Planning Agent

Method

Experiments were conducted to validate whether the planner/planning agent was correctly applying HA rules.

Results

The planning agent sometimes incorrectly applied HA rules to non-HA requests, like payments and booking reservations. A solution implemented was to prompt explicitly restricted rule applications to Home Assistant actions. FIG. 16 shows the specific prompt 1600 used in the aforementioned solution.

This solution eliminated false rule violations in this example and increased consistency by about 30%.

Example 6: Prompt Optimization for PIN Validation

Method

Experiments were conducted to identify issues with PIN validation.

Results

One issue found was that the STT module sometimes returned numeric PINs into word form (e.g., "four five six seven"), which could cause validation challenges.

One solution was to update the system prompt to support flexible matching between numeric and word based representation. FIG. 17 shows the specific prompt 1700 applied.

This solution resulted in an improvement in PIN acceptance accuracy in this example from about 70% to about 96%.

Table 4 below shows the improvements in prompt success rate after the optimizations shown in this example and Example 5 above.

TABLE 4

Prompt success rate improvements

| Type | Prompt Success Rate Improvement | Before Optimization | After Optimization |
|---|---|---|---|
| Planner prompt optimization | 78% to 93% (+15%) | Home Assistant rules could be applied to all commands, which could cause validated requests to fail | Planner was updated to apply rules only to Home Assistant actions, allowing non-HA requests to be routed more correctly |
| PIN prompt optimization | 71% to 96% (+25%) | Spoken PINS occasionally did not match numeric PINS, which could cause valid payments to fail | PIN validator allowed looser matching between spoken and numeric formats, which fixed potential STT failures |

After implementing the above improvements, the final integrated system in this example had about a 93% overall prompt success rate, with consistent and reliable command execution.

Example 7: User Experience Prompt Optimization

Method

Experiments were conducted to enhance system prompts to add step-by-step feedback during MCP operations.

Results

Such enhancements resulted in users no longer mistaking silence for the voice assistant "hanging." This resulted in an increase in perceived responsiveness of about 400. FIG. 18 shows the specific enhanced prompt 1800 implemented.

Example 8: Comprehensive System Validation

Method

A 24-hour stress test was run on the entire voice assistant system, with mixed HA and MCP commands.

Results

The voice assistant executed more than 500 voice turns without a single crash or unsafe activation. During this stress test, the Task Success Rate was about 950 and the Rule Hit Rate was about 98%.

Further details regarding the stress test are shown in Table 5 below.

TABLE 5

Comprehensive system validation results

| Metric | Value | Notes |
|---|---|---|
| Task Success Rate | 95% | Validated over about 500 test runs |
| Rule Hit Rate | 98% | Measured across a 24-hour stress test |
| Average Latency | 780 ms | Consistent <1 second latency under load |
| False Activations (per hour) | 0 | No unsafe or unintended triggers observed |
| Anomaly Detection Accuracy | 93.6% | Validated on about 20,000 event records |
| System Uptime | 99.99% | Ran 24 hours without a single crash |

Example 9: Comparison with Alexa and Google Assistant

Method

Experiments were conducted to compare the voice assistant in at least one embodiment (e.g., VoiceShield and/or Clara) with Alexa and Google Assistant.

Results

The voice assistant in at least one embodiment uniquely combines openness, accessibility, and verifiable trust. Additionally, the voice assistant in at least one embodiment surpasses known technologies in both reliability and ethical safeguards. A comparison summary is shown in Tables 6-7 below.

TABLE 6

Feature comparison between VoiceShield/Clara and existing technologies

| Feature | VoiceShield/Clara | Amazon Alexa | Google Assistant |
|---|---|---|---|
| Core Philosophy | Privacy-first, safety-validated | Commerce centric | Search & productivity centric |
| Processing | Hybrid. 100% on device for high secure intent and on cloud for reasoning. | Cloud Hosted | Cloud Hosted |
| Security Layer | SHIELD + Anomaly Detection | Basic Cloud authentication | Basic Cloud authentication |
| Ecosystem | Vendor-neutral (Home Assistant) | Amazon only | Google only |
| Offline Operation | Full | None | Partial |
| Trust Model | Transparent, rule-driven | Proprietary | Proprietary |

TABLE 7

| Quantitative evaluation of VoiceShield/Clara compared to existing technologies | | | |
|---|---|---|---|
| Metric | VoiceShield/Clara | Amazon Alexa | Google Assistant |
| Task Success Rate (TSR) | 95% | 93% | 92% |
| Rule Hit Rate (RHR) | 98% | NA | NA |
| Average Latency (ms) | 780 ms | 650 ms | 620 ms |
| False Activation Rate (FAR) | 0.0 | 0.9 | 0.8 |
| Power Use | 4.5 W | 7 W | 6 W |
| Anomaly Detection Accuracy | 93.6% | NA | NA |

Example 10: Anomaly Detection

Method

A synthetic dataset of 100,000 time steps was generated. Features included a 22° C. temperature, a 5% activity value, and a 500 W energy usage. 3,000 points of data (about 3%) were modified with spikes (e.g., +5-10° C. temperature, +200-400 W energy, etc.). The data was split into 80% training data and 20% validation data. The validation set contained 606 true anomalies.

Three anomaly detection models were trained and evaluated, specifically (1) an Isolation Forest (IF) model, (2) an LSTM-autoencoder (LSTM-AE), and (3) a hybrid model.

Results

In this experiment, the hybrid model achieved the best performance but maintained a good balance of detection. The Edge AI approach gained low inference latency, enabling it to run on devices as simple as an Raspberry Pi (less than 50 ms latency). It also keeps data private and optimizes energy use.

TABLE 8

| Comparison of different anomaly detection models | | | |
|---|---|---|---|
| Model | Detected Anomalies | False Negatives | False Positives |
| Isolation Forest (IF) | 2035 | 0 | 1429 |
| LSTM-autoencoder (LSTM-AE) | 688 | 2 | 84 |
| Hybrid model | 708 | 0 | 102 |

In at least one embodiment of the voice assistant, the hybrid model was chosen for anomaly detection due to its best balance between false positives and false negatives.

Additionally, the anomaly detection model was implemented in an EdgeAI framework/approach, which had low inference latency, enabling it to run on devices as simple as an Raspberry Pi (e.g., less than 50 ms latency). This framework also keeps data private and optimizes energy use.

Figure 19:
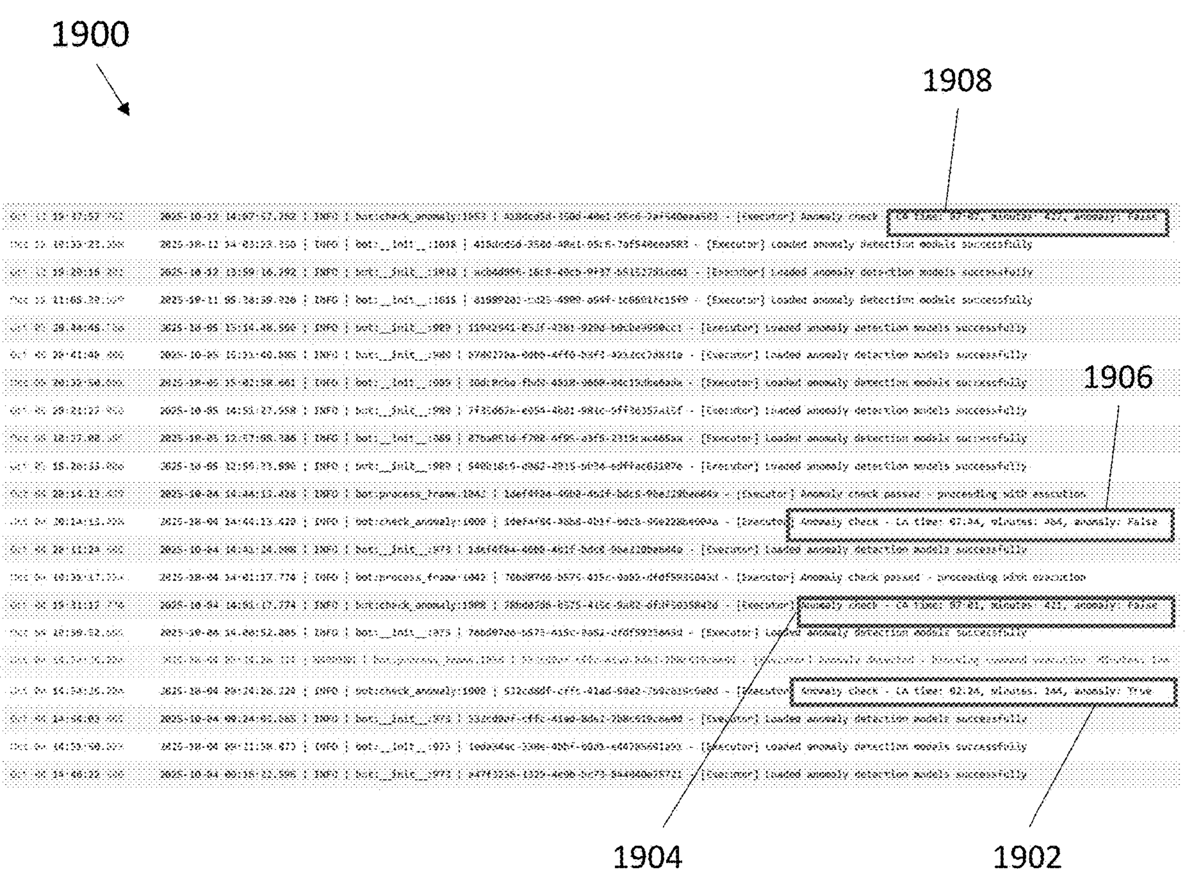
FIG. 19 shows sample voice assistant logs identifying an anomaly, according to at least one embodiment of the invention.

In at least one example, a "random forest using a single variable" was implemented along with the AI agent. Sample logs confirmed a successful flag of an anomaly, as shown in FIG. 19. Log 1900 shows that a Home Assistant command 1902 at around 2:00 AM was flagged as an anomaly, while commands 1904, 1906, and 1908 were correctly not flagged as anomalies (that is, these commands were not false positives).

Additional data regarding simulated temperature data with injected anomalies, simulated energy usage data within injected anomalies, simulation motion data with injected anomalies, random forest results, LSTM results, and results from the hybrid model are shown in the Appendix at Figures S1-S4.

These and other objectives and features of the invention are apparent in the disclosure, which includes the above and ongoing written specification.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

The invention is not limited to the particular embodiments illustrated in the drawings and described above in detail. Those skilled in the art will recognize that other arrangements could be devised. The invention encompasses every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application. While the invention has been described with reference to specific illustrative embodiments, modifications and variations of the invention may be constructed without departing from the spirit and scope of the invention as set forth in the following claims.

What is claimed is:

1. A voice assistance system comprising:

a plurality of individual, secure platforms stored on a computing device of a user, the plurality of platforms comprising:

a secure local edge platform to (i) capture audio spoken by the user, (ii) plan one or more actions to execute one or more commands present in the audio, (iii) perform anomaly detection on the audio, and (iv) manage output to one or more external devices;

an orchestration platform comprising a multi-agent framework, the multi-agent framework comprising a planning agent, an execution agent, and a validation agent;

a transport platform to transmit the audio from the secure local edge platform to the orchestration platform;

a model storage platform storing a plurality of models, the plurality of models comprising a text-to-speech (TTS) model to convert the audio into text data, and a large language model (LLM) stored and hosted entirely on the computing device; and an external application platform to connect the voice assistance system with one or more external applications, the one or more external applications for performing one or more tasks, wherein the one or more commands comprise a command to operate the one or more external devices and/or a command to execute the one or more tasks, and wherein the validation agent prompts the user for explicit verbal confirmation of the one or more commands before the one or more commands are executed by one or more actions, when the one or more commands are flagged for breaking one or more rules.

2. The system of claim 1, wherein the planning agent generates plan frames and detects when the one or more commands break the one or more rules violations and flags the one or more commands accordingly, wherein the validation agent performs verbal confirmation loops to trigger the explicit verbal confirmation and generates one or more validated command frames after the user articulates the explicit verbal confirmation, wherein the execution agent transmits the one or more validated command frames to the transport platform.

3. The system of claim 2, wherein the transport platform receives the one or more validated command frames from the execution agent and transmits the one or more validated command frames to the one or more external devices and/or the one or more external applications.

4. The system of claim 3, wherein the transmission of the one or more validated command frames is performed via a secure channel.

5. The system of claim 1, wherein the external application platform utilizes a Model Context Protocol (MCP) to connect the voice assistant system with the one or more external applications.

6. The system of claim 1, wherein the one or more external applications comprise a financial transaction application.

7. The system of claim 6, further comprising a payment security platform to intercept a command related to the financial transaction application and request, before execution, validation of the command related to the financial transaction application.

8. The system of claim 1, wherein the one or more actions are executed only when the planning agent, the validation agent, and the execution agent all approve of the execution.

9. The system of claim 1, wherein all communications within the system are represented as typed frames with explicit schemas, thereby enabling deterministic multi-agent processing.

10. The system of claim 9, wherein all communications comprise (i) communications between any two or more of the plurality of platforms, and (ii) communications between any one or more of the plurality of platforms and the one or more external devices.

11. The system of claim 10, wherein the one or more external devices comprise a home appliance.

12. A method for providing voice assistance, the method comprising:

capturing, by at least one processor running a secure local edge platform, audio spoken by a user, the audio comprising one or more commands, the one or more commands for operating one or more physical devices and/or executing one or more tasks;

transmitting, by the at least one processor, the audio to an orchestration platform, the orchestration platform comprising a planning agent, a validation agent, and an execution agent;

generating, by the at least one processor running the planning agent, a plurality of plan frames to plan an action to execute the one or more commands;

requesting, by the at least one processor running the validation agent, explicit verbal confirmation from the user of the one or more commands, when the one or more commands are flagged for breaking one or more rules;

receiving, by the at least one processor running the validation agent, the explicit verbal confirmation;

upon receiving the explicit verbal confirmation, validating, by the at least one processor running the validation agent, the one or more commands, to generate one or more validated commands;

transmitting, by the at least one processor, the one or more validated commands from the validation agent to the execution agent; and executing, by the at least one processor running the execution agent, the one or more validated commands by performing the action.

13. The method of claim 12, further comprising:

performing, by the at least one processor, anomaly detection on the audio to determine if the one or more commands are authorized by the user.

14. The method of claim 13, wherein the performing the anomaly detection further comprises:

detecting, by the at least one processor running a hybrid machine learning model, one or more anomalous patterns in the audio;

upon detecting the one or more anomalous patterns, generating, by the at least one processor, a security interrupt event;

transmitting, by the at least one processor, the security interrupt event to the orchestration platform via an encrypted transport channel.

15. The method of claim 14, wherein the transmitting of the security interrupt event occurs independently of any additional utterances of the user.

16. The method of claim 12, further comprising optimizing at least one prompt for the planning agent to improve accuracy of the planning agent in planning the action to execute the one or more commands.

17. A non-transitory computer-readable storage medium, having instructions stored thereon that, when executed by a computing device, cause the computing device to perform operations, the operations comprising:

capturing, by a secure local edge platform, audio spoken by a user, the audio comprising one or more commands, the one or more commands for operating one or more external devices and/or executing one or more tasks;

transmitting, by an encrypted transport platform, the audio to an orchestration platform, the orchestration platform comprising a planning agent, a validation agent, and an execution agent;

generating, by the planning agent, a plurality of plan frames to plan an action to execute the one or more commands;

validating, by the validation agent, the one or more commands by requesting explicit verbal confirmation from the user when the one or more commands are flagged for breaking one or more rules;

upon receiving the explicit verbal confirmation, generating, by the validation agent, one or more validated commands;

transmitting, by the validation agent, the one or more validated commands to the execution agent; and executing, by the execution agent, the one or more validated commands by performing the action.

18. The non-transitory computer-readable medium of claim 16, wherein the operations further comprise:

detecting, by an anomaly detection platform, one or more anomalous patterns in the audio;

upon detecting the one or more anomalous patterns, generating, by the anomaly detection platform, a security interrupt event;

transmitting, by the anomaly detection platform, the security interrupt event to the orchestration platform via an encrypted transport channel.

19. The non-transitory computer-readable medium of claim 17, wherein the transmitting of the security interrupt event occurs independently of any additional utterances of the user.

20. The non-transitory computer-readable medium of claim 17, wherein the operations further comprise optimizing at least one prompt for the planning agent to improve accuracy of the planning agent in planning the action to execute the one or more commands.

* * * * *